(12) United States Patent
Lee et al.

(10) Patent No.: US 7,250,989 B2
(45) Date of Patent: Jul. 31, 2007

(54) SUBSTRATE BONDING APPARATUS HAVING ALIGNMENT SYSTEM WITH ONE END PROVIDED INSIDE VACUUM CHAMBER FOR LIQUID CRYSTAL DISPLAY DEVICE

(75) Inventors: Sang Seok Lee, Taegu-Kwangyokshi (KR); Sang Ho Park, Pusan-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 179 days.

(21) Appl. No.: 11/043,042

(22) Filed: Jan. 27, 2005

(65) Prior Publication Data

US 2005/0128422 A1 Jun. 16, 2005

Related U.S. Application Data

(62) Division of application No. 10/259,439, filed on Sep. 30, 2002, now Pat. No. 6,885,427.

(30) Foreign Application Priority Data

Mar. 15, 2002 (KR) .............................. P2002-14182
Mar. 25, 2002 (KR) .............................. P2002-15953

(51) Int. Cl.
*G02F 1/13* (2006.01)
*G02F 1/1333* (2006.01)
*B32B 31/00* (2006.01)

(52) U.S. Cl. ........................ 349/1; 349/158; 349/187; 156/381

(58) Field of Classification Search .................... 349/1, 349/153, 158, 187–191; 156/378, 556, 379, 156/379.8, 381, 382; 445/25, 66, 67, 70; 228/44.3, 44.7, 49.5; 269/21; 700/114
See application file for complete search history.

(56) References Cited

U.S. PATENT DOCUMENTS

| 3,978,580 | A | 9/1976 | Leupp et al. .................. 216/23 |
| 4,094,058 | A | 6/1978 | Yasutake et al. ............ 349/156 |
| 4,653,864 | A | 3/1987 | Baron et al. ................. 349/156 |
| 4,691,995 | A | 9/1987 | Yamazaki et al. ........... 349/189 |
| 4,775,225 | A | 10/1988 | Tsuboyama et al. ........ 349/155 |
| 5,222,293 | A | 6/1993 | Ozimek et al. ............. 156/378 |
| 5,247,377 | A | 9/1993 | Omeis et al. ................ 349/126 |

(Continued)

FOREIGN PATENT DOCUMENTS

EP            1003066          5/2000

(Continued)

*Primary Examiner*—Toan Ton
*Assistant Examiner*—Tai Duong
(74) *Attorney, Agent, or Firm*—McKenna Long & Aldridge LLP

(57) ABSTRACT

A substrate bonding apparatus for a liquid crystal display device includes a vacuum processing chamber, a lower stage provided in an interior of the vacuum chamber, an upper stage provided in the interior of the vacuum chamber and having at least one first through hole, a stage moving system having a stage moving axis connected to one of the lower and upper stages, and a driving motor, and at least one first alignment system having one end provided in the interior of the vacuum chamber for aligning a first substrate and a second substrate.

9 Claims, 24 Drawing Sheets

U.S. PATENT DOCUMENTS

| | | | | |
|---|---|---|---|---|
| 5,263,888 | A | 11/1993 | Ishihara et al. | 445/25 |
| 5,379,139 | A | 1/1995 | Sato et al. | 349/155 |
| 5,406,989 | A | 4/1995 | Abe | 141/7 |
| 5,499,128 | A | 3/1996 | Hasegawa et al. | 349/155 |
| 5,507,323 | A | 4/1996 | Abe | 141/31 |
| 5,511,591 | A | 4/1996 | Abe | 141/7 |
| 5,539,545 | A | 7/1996 | Shimizu et al. | 349/86 |
| 5,548,429 | A | 8/1996 | Tsujita | 349/187 |
| 5,642,214 | A | 6/1997 | Ishii et al. | 349/96 |
| 5,680,189 | A | 10/1997 | Shimizu et al. | 349/123 |
| 5,742,370 | A | 4/1998 | Kim et al. | 349/124 |
| 5,757,451 | A | 5/1998 | Miyazaki et al. | 349/106 |
| 5,783,026 | A * | 7/1998 | Natarajan et al. | 156/378 |
| 5,852,484 | A | 12/1998 | Inoue et al. | 349/86 |
| 5,854,664 | A | 12/1998 | Inoue et al. | 349/92 |
| 5,861,932 | A | 1/1999 | Inata et al. | 349/156 |
| 5,875,922 | A | 3/1999 | Chastine et al. | 222/1 |
| 5,952,676 | A | 9/1999 | Sato et al. | 257/59 |
| 5,956,112 | A | 9/1999 | Fujimori et al. | 349/156 |
| 6,001,203 | A | 12/1999 | Yamada et al. | 156/106 |
| 6,011,609 | A | 1/2000 | Kato et al. | 349/190 |
| 6,016,178 | A | 1/2000 | Kataoka et al. | 349/156 |
| 6,016,181 | A | 1/2000 | Shimada | 349/156 |
| 6,036,568 | A * | 3/2000 | Murouchi et al. | 445/25 |
| 6,055,035 | A | 4/2000 | Von Gutfeld et al. | 349/187 |
| 6,163,357 | A | 12/2000 | Nakamura | |
| 6,211,935 | B1 | 4/2001 | Yamada | 349/149 |
| 6,219,126 | B1 | 4/2001 | Von Gutfeld | 349/153 |
| 6,226,067 | B1 | 5/2001 | Nishiguchi et al. | 349/155 |
| 6,236,445 | B1 | 5/2001 | Foschaar et al. | 349/156 |
| 6,304,306 | B1 | 10/2001 | Shiomi et al. | 349/88 |
| 6,304,311 | B1 | 10/2001 | Egami et al. | 349/189 |
| 6,337,730 | B1 | 1/2002 | Ozaki et al. | 349/156 |
| 6,414,733 | B1 | 7/2002 | Ishikawa et al. | 349/110 |
| 6,665,043 | B1 | 12/2003 | Okuyama et al. | 349/187 |
| 2001/0021000 | A1 | 9/2001 | Egami et al. | 349/124 |
| 2002/0008838 | A1 | 1/2002 | Matsuda | 349/187 |
| 2003/0147038 | A1 | 8/2003 | Lee et al. | 349/187 |
| 2003/0173032 | A1 | 9/2003 | Lee et al. | 156/382 |
| 2003/0178468 | A1 | 9/2003 | Lee et al. | 228/102 |

FOREIGN PATENT DOCUMENTS

| | | |
|---|---|---|
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 12/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-143923 | 6/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-313870 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-174477 | 7/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-88424 | 2/1999 |
| JP | 11-64811 | 3/1999 |
| JP | 11-109388 | 4/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-281988 | 10/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |

| | | | | | |
|---|---|---|---|---|---|
| JP | 2000-241824 | 8/2000 | JP | 2002-079160 | 3/2002 |
| JP | 2000-284295 | 10/2000 | JP | 2002-82340 | 3/2002 |
| JP | 2000-292799 | 10/2000 | JP | 2002-90759 | 3/2002 |
| JP | 2000-310759 | 11/2000 | JP | 2002-90760 | 3/2002 |
| JP | 2000-310784 | 11/2000 | JP | 2002-107740 | 4/2002 |
| JP | 2000-338501 | 12/2000 | JP | 2002-122870 | 4/2002 |
| JP | 2001-5401 | 1/2001 | JP | 2002-122872 | 4/2002 |
| JP | 2001-5405 | 1/2001 | JP | 2002-122873 | 4/2002 |
| JP | 2001-13506 | 1/2001 | JP | 2002-131762 | 5/2002 |
| JP | 2001-33793 | 2/2001 | JP | 2002-139734 | 5/2002 |
| JP | 2001-42341 | 2/2001 | JP | 2002-156518 | 5/2002 |
| JP | 2001-51284 | 2/2001 | JP | 2002-169166 | 6/2002 |
| JP | 2001-66615 | 3/2001 | JP | 2002-169167 | 6/2002 |
| JP | 2001-91727 | 4/2001 | JP | 2002-182222 | 6/2002 |
| JP | 2001-117105 | 4/2001 | JP | 2002-202512 | 7/2002 |
| JP | 2001-117109 | 4/2001 | JP | 2002-202514 | 7/2002 |
| JP | 2001-133745 | 5/2001 | JP | 2002-214626 | 7/2002 |
| JP | 2001-133794 | 5/2001 | JP | 2002-229042 | 8/2002 |
| JP | 2001-133799 | 5/2001 | JP | 2002-236276 | 8/2002 |
| JP | 2001-142074 | 5/2001 | JP | 2002-258299 | 8/2002 |
| JP | 2001-147437 | 5/2001 | JP | 2002-236292 | 9/2002 |
| JP | 2001-154211 | 6/2001 | JP | 2002-277865 | 9/2002 |
| JP | 2001-166272 | 6/2001 | JP | 2002-277866 | 9/2002 |
| JP | 2001-166310 | 6/2001 | JP | 2002-277881 | 9/2002 |
| JP | 2001-183683 | 7/2001 | JP | 2002-31142 | 10/2002 |
| JP | 2001-201750 | 7/2001 | JP | 2002-287156 | 10/2002 |
| JP | 2001-209052 | 8/2001 | JP | 2002-296605 | 10/2002 |
| JP | 2001-209056 | 8/2001 | JP | 2002-311438 | 10/2002 |
| JP | 2001-209057 | 8/2001 | JP | 2002-311440 | 10/2002 |
| JP | 2001-209058 | 8/2001 | JP | 2002-323687 | 11/2002 |
| JP | 2001-209060 | 8/2001 | JP | 2002-323694 | 11/2002 |
| JP | 2001-215459 | 8/2001 | JP | 2002-333628 | 11/2002 |
| JP | 2001-222017 | 8/2001 | JP | 2002-333635 | 11/2002 |
| JP | 2001-235758 | 8/2001 | JP | 2002-333843 | 11/2002 |
| JP | 2001-255542 | 9/2001 | JP | 2002-341329 | 11/2002 |
| JP | 2001-264782 | 9/2001 | JP | 2002-341355 | 11/2002 |
| JP | 2001-272640 | 10/2001 | JP | 2002-341356 | 11/2002 |
| JP | 2001-281675 | 10/2001 | JP | 2002-341357 | 11/2002 |
| JP | 2001-281678 | 10/2001 | JP | 2002-341358 | 11/2002 |
| JP | 2001-282126 | 10/2001 | JP | 2002-341359 | 11/2002 |
| JP | 2001-305563 | 10/2001 | JP | 2002-341362 | 11/2002 |
| JP | 2001-330837 | 11/2001 | JP | 2003-43500 | 2/2003 |
| JP | 2001-330840 | 11/2001 | KR | 0156422 | 7/1998 |
| JP | 2001-356353 | 12/2001 | KR | 2000-35302 | 6/2000 |
| JP | 2001-356354 | 12/2001 | KR | 1020010082833 A | 8/2001 |
| JP | 2002-14360 | 1/2002 | KR | 1020020015004 A | 2/2002 |
| JP | 2002-23176 | 1/2002 | | | |
| JP | 2002-49045 | 2/2002 | * cited by examiner | | | cell area   dummy area cell area   dummy area

SUBSTRATE BONDING APPARATUS HAVING ALIGNMENT SYSTEM WITH ONE END PROVIDED INSIDE VACUUM CHAMBER FOR LIQUID CRYSTAL DISPLAY DEVICE

This is a divisional of application Ser. No. 10/259,439, filed on Sep. 30, 2002 now U.S. Pat. No. 6,885,427.

The present invention claims the benefit of Korean Patent Application Nos. P2002-14182 filed in Korea on Mar. 15, 2002, and P2002-15953 filed in Korea on Mar. 25, 2002, which are hereby incorporated by reference.

BACKGROUND OF THE INVENTION

1. Field of the Invention

The present invention relates to a bonding apparatus, and more particularly, to a substrate bonding apparatus for bonding substrates to each other during the manufacturing of a liquid crystal display (LCD) device.

2. Discussion of the Related Art

In response to an increased demand for various display devices, flat panel type displays such as liquid crystal display (LCD), plasma display panel (PDP), electro luminescent display (ELD), and vacuum fluorescent display (VFD) have been developed. In particular, with characteristic advantages of high resolution, lightness, thinness, and low power consumption, LCD devices has been commonly used as a mobile image display device to replace cathode ray tube (CRT) devices. In addition, LCD devices are commonly used for monitors of notebook computers, and as monitors of computers and televisions. In order to use LCD devices as general image displays, operational characteristics of low weight, thin profile, and low power consumption must be maintained.

A method for manufacturing an LCD device may be divided into two catagories: liquid crystal injecting and liquid crystal dispensing. The liquid crystal injecting type includes steps of forming a sealant pattern on a first substrate to form an injection inlet, bonding the first substrate to a second substrate in a vacuum state, and injecting liquid crystal material through the injection inlet. The liquid crystal dispensing method, which is disclosed in Japanese Patent Application Nos. 11-089612 and 11-172903, includes steps of dispensing liquid crystal material on a first substrate, arranging a second substrate over the first substrate, and moving the first and second substrates, thereby bonding the first and second substrates to each other in a vacuum state. Compared to the liquid crystal injection method, the liquid crystal dispensing method is advantageous in that various steps, such as forming a liquid crystal material injection inlet, injecting the liquid crystal material, and sealing the injection inlet can be omitted.

FIG. 1 and FIG. 2 illustrate a related art vacuum bonding device, to which the prior art liquid crystal dispensing method is applied. The related art vacuum bonding device includes a frame 10 forming the exterior, a stage part 22 and 21, a sealant dispenser (not shown), a liquid crystal dispenser 30, a chamber part 32 and 31, a chamber moving system, a stage moving system, an alignment system and a vacuum pump 60.

At this time, the stage part is divided into lower and upper stages 22 and 21, and the sealant dispenser and the liquid crystal dispenser 30 are provided at a side of location where a bonding process is carried out. The chamber part is divided into lower and upper chamber units 32 and 31 that are to be combined. Also, the chamber moving system includes a driving motor 40 that is driven to selectively move the lower chamber unit 32 to a location at which the bonding process is carried out, or to a location at which the dispensing of the sealant or the liquid crystal occurs. The stage moving system includes another driving motor 50 that is driven to selectively move the upper stage 21 to the upper or lower part. The vacuum pump 60 is connected to a tube that is connected to the inside of the upper chamber unit 31 so as to provide an air inhalation to the inside of the upper chamber unit 31 for maintaining the upper chamber unit in the vacuum state. The alignment system includes an align camera 70 that checks an alignment state between the substrate 52 (hereinafter, referenced as "second substrate") fixed to the upper stage 21, and the substrate 51 (hereinafter, referenced as "first substrate") fixed to the lower stage 22. Also, the upper chamber unit is provided with a through hole 31a that checks the alignment state between the substrates through the align camera 70.

A method for manufacturing the LCD device with the related art device for fabricating the substrates will be explained as follows.

First, the second substrate 52 is loaded to the upper stage 21, and is fixed thereto. Then, the first substrate 51 is loaded to the lower stage 22, and is fixed thereto. In this state, the lower chamber unit 32, having the lower stage 22, is moved by the chamber moving system 40 to a processing location for depositing the sealant and dispensing the liquid crystal, as shown in FIG. 1. Upon completing the deposition of the sealant and the dispensing of the liquid crystal, the lower chamber unit 32 is moved to a processing location at which the substrates are bonded to each other, as shown in FIG. 2. After that, the lower and upper chamber units 32 and 31 are assembled together by the chamber moving system 40 to form a vacuum tight seal, and the vacuum pump 60 is driven so as to make the vacuum state.

The upper stage 21 is moved downwardly, and is positioned at a location for aligning each substrate 51 and 52. Then, the align camera 70 checks each align mark of the first and second substrates 51 and 52, respectively fixed to each stage, through a hole provided in the upper chamber unit 31 and a through hole 21a provided in the upper stage 21. At this time, displacement of each substrate is checked by the align camera 70, and then is calculated to a numeral value. Then, each substrate is aligned in controlling the stage moving system according to the numeral value.

On completing the alignment of the substrates, the upper stage 21 is moved further downward by the stage moving system 50. The second substrate 52 fixed to the upper stage 21 is contacted to the first substrate 51 fixed to the lower stage 22, and then a constant pressure is applied to the substrates, thereby bonding the substrates to each other.

However, the related art bonding device of the LCD device has the following problems.

As the align camera comes close to each align mark of the substrates, the align accuracy is improved in that the align camera can exactly check the align state of the substrates. However, in the related art bonding device, a distance ($L_1$) is maintained between the lens of the align camera and an external surface of the upper chamber unit, so that it is hard to exactly check the align state of each substrate. Especially, in a case of the large-sized LCD device, the align accuracy is deteriorated in that the distance becomes great between the lens of the align camera and the external surface of the upper chamber unit. Also, a distance ($L_2$) is generated between an internal surface of the upper chamber unit and the align mark of the substrate, thereby deteriorating the align accuracy. Furthermore, only one align camera is used for checking the align marks of each substrate in the related art bonding device, thereby increasing processing time.

If the align camera obtaining high accuracy is not used for checking the align marks of each substrate in the large-sized LCD device, it is hard to exactly align each substrate. Accordingly, the alignment system having a structure that is suitable for manufacturing the large-sized LCD device has been actively studied and is needed for large-sized LCD devices.

SUMMARY OF THE INVENTION

Accordingly, the present invention is directed to a substrate bonding apparatus that substantially obviates one or more problems due to limitations and disadvantages of the related art.

An object of the present invention is to provide a substrate bonding apparatus that precisely aligns first and second substrates of a liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, A substrate bonding apparatus for a liquid crystal display device includes a vacuum processing chamber, a lower stage provided in an interior of the vacuum chamber, an upper stage provided in the interior of the vacuum chamber and having at least one first through hole, a stage moving system having a stage moving axis connected to one of the lower and upper stages, and a driving motor, and at least one first alignment system having one end provided in the interior of the vacuum chamber for aligning a first substrate and a second substrate.

In another aspect, a substrate bonding apparatus of a liquid crystal display device includes a vacuum processing chamber, lower and upper stages provided in lower and upper spaces of the vacuum processing chamber, respectively, a stage moving system having a moving axis connected to one of the lower and upper stages, and a driving motor, at least one first alignment system for aligning a first set of alignment marks positioned on a first location of a first substrate and a second substrate, and at least one second alignment system for aligning a second set of alignment marks positioned on a second location of the first and second substrates.

In another aspect, a substrate bonding apparatus of a liquid crystal display device includes a vacuum processing chamber, and lower and upper stages provided in lower and upper spaces of the vacuum chamber, respectively, wherein at least one of the upper and lower stages have a plurality of through holes aligned to alignment marks of a first substrate and a second substrate.

In another aspect, a substrate bonding apparatus of a liquid crystal display device includes a vacuum processing chamber, an upper stage provided in an upper space of the vacuum processing chamber, a lower stage provided in a lower space of the vacuum processing chamber, the lower stage having at least one first through hole, a stage moving system for moving each of the upper and lower stages, and at least one first alignment system provided in a lower portion of the vacuum processing chamber for aligning a first substrate affixed to the lower stage and a second substrate affixed to the upper stage through the first through hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
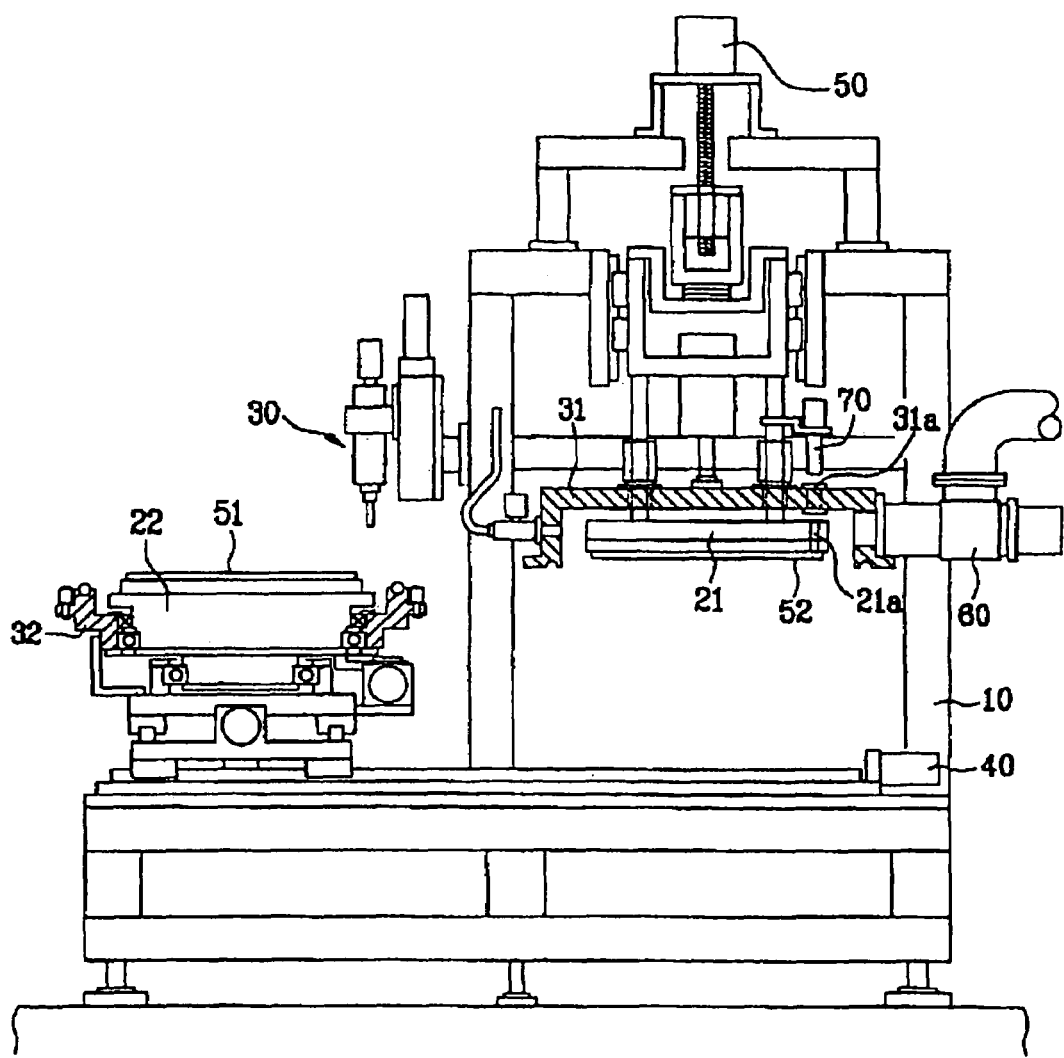
FIG. 1 is a cross sectional view of a substrate bonding device during a loading process according to the related art.
Figure 2:
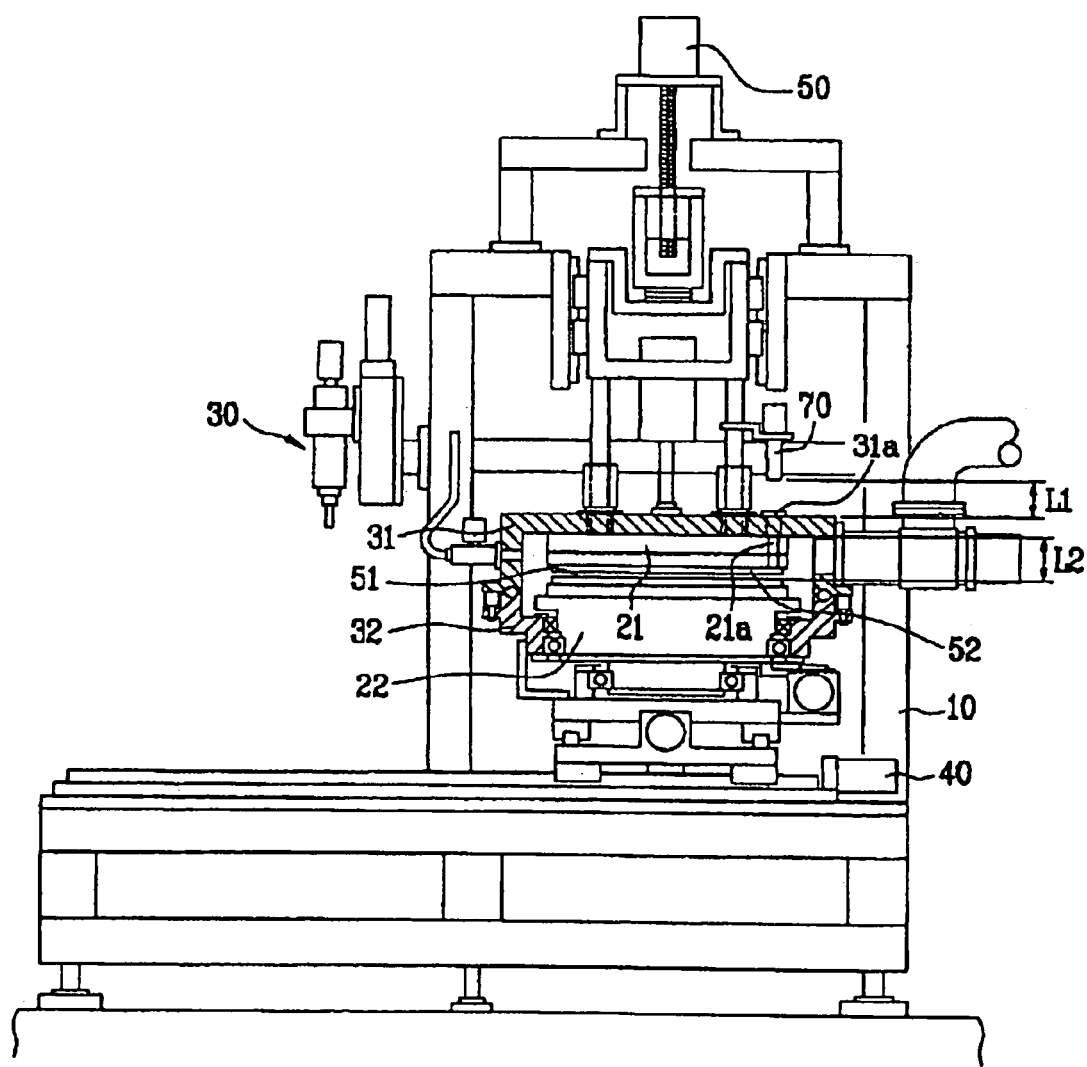
FIG. 2 is a cross sectional view of the substrate bonding device during a substrate bonding process according to the related art.
Figure 3:
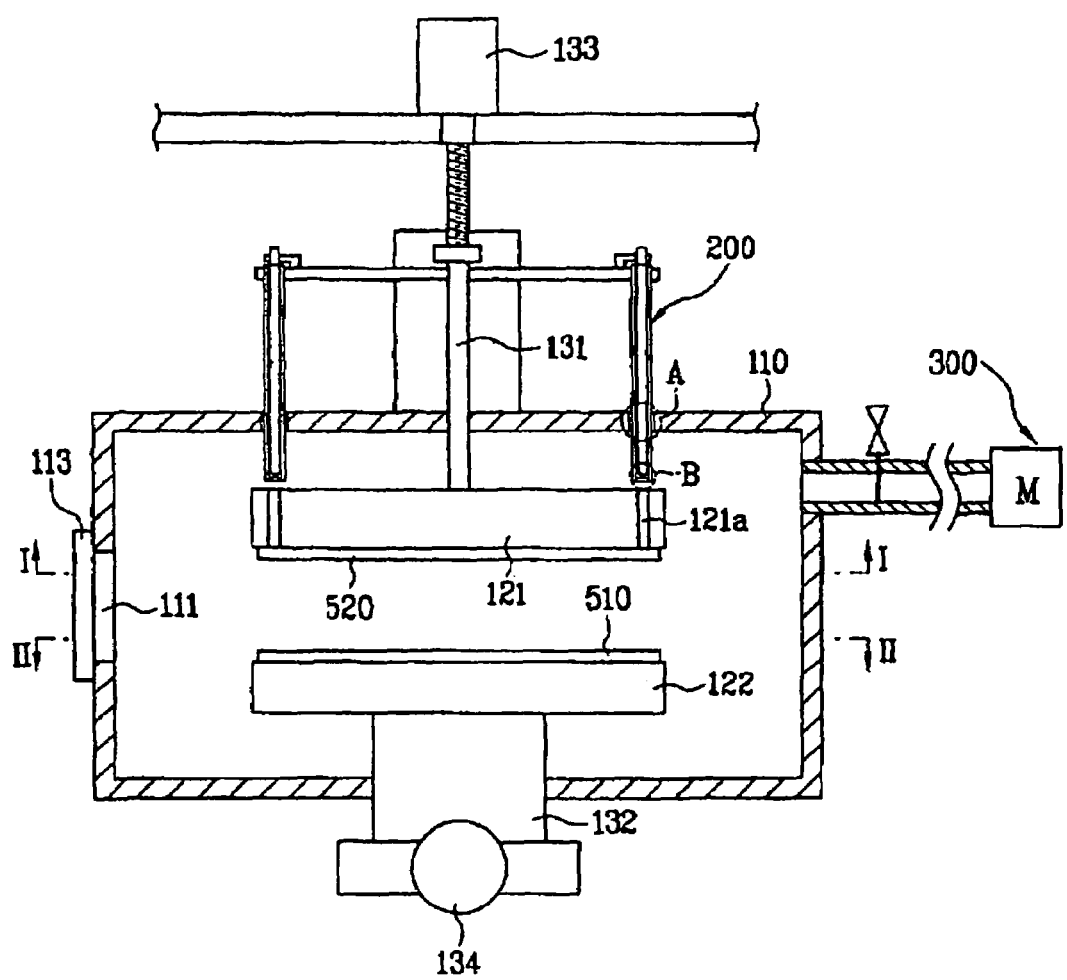
FIG. 3 is a cross sectional view of an exemplary substrate bonding apparatus according to the present invention.
Figure 4A:
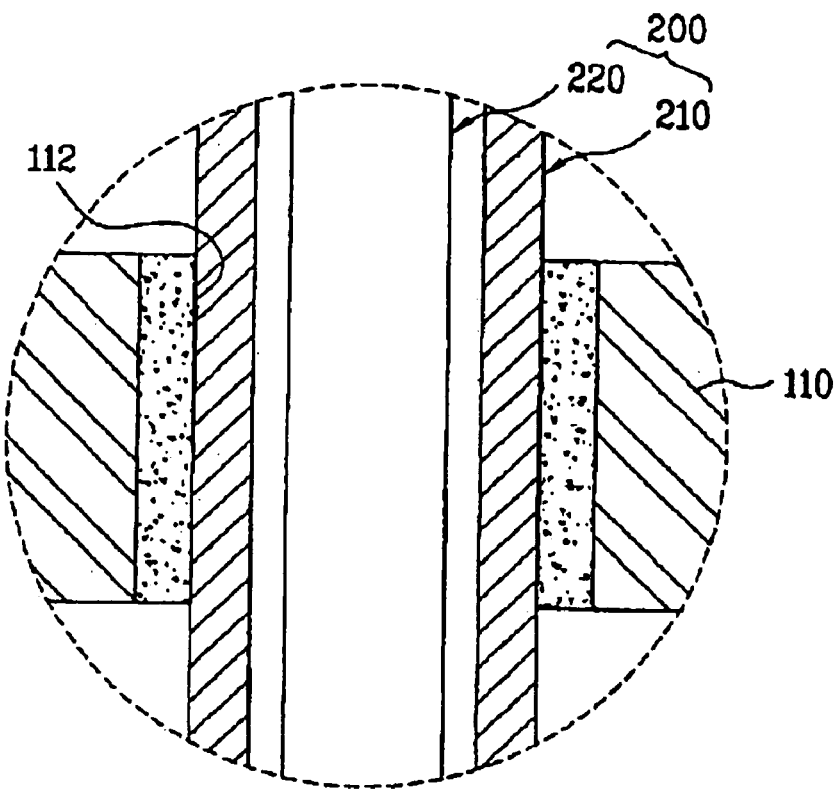
FIG. 4A is an enlarged cross sectional view of region "A" of FIG. 3 according to the present invention.
Figure 4B:
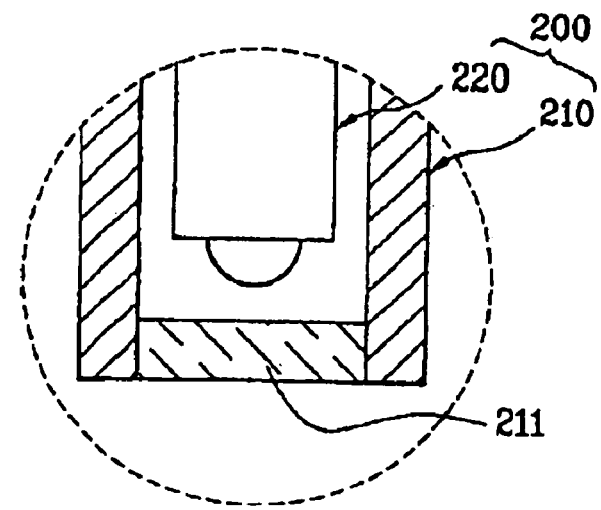
FIG. 4B is an enlarged cross sectional view of region "B" of FIG. 3 according to the present invention.

FIG. 3 is a cross sectional view of an exemplary substrate bonding apparatus according to the present invention, and FIGS. 4A and 4B are enlarged cross sectional views of regions "A" and "B" of FIG. 3 according to the present invention. In FIG. 3, the substrate bonding apparatus may include a vacuum processing chamber 110, an upper stage 121, a lower stage 122, a stage moving system, and a first alignment system 200.

The vacuum processing chamber 110 may include a plurality of connecting holes 112 (in FIG. 4A) positioned along uppermost surfaces of the vacuum processing chamber 110. Each of the connecting holes 112 may be aligned with alignment marks positioned on first and second substrates 510 and 520.

The upper stage 121 may include a plurality of first through holes 121a that may be aligned with the connecting holes 112 and with the alignment marks on the first and second substrates 510 and 520. The first through holes 121a may be formed at two or more opposite corners of the upper stage 121. Alternatively, the first through holes 121a may be formed at central portions of each edge of the upper stage 121.

The stage moving system may include an upper stage moving axis 131 that moves the upper stage 121 along an upward and downward direction, a lower stage moving axis 132 that rotates the lower stage 122 to left and right sides, and lower and upper stage driving motors 133, 134 for driving the lower and upper stage moving axes 132, 131. The lower and upper stage driving motors 134, 133 may be provided at an exterior of the vacuum processing chamber 110. Alternatively, lower and upper stage driving motors 134, 133 may be provided at an interior of the vacuum processing chamber 110. Moreover, the lower and upper stage driving motors 134, 133 may be provided at both an exterior and interior of the vacuum processing chamber 110.

The first alignment system 200 may be provided with a first camera receiving portion 210 and a first align camera 220, as shown in FIG. 4B. The first camera receiving portion 210 may be formed of a tube shape, with a first end provided at the interior of the vacuum processing chamber 110 by passing through one of the connecting holes 112. When the first camera receiving portion 210 passes through the connecting hole 112, a space may be formed between sidewalls of the connecting hole 112 and a side of the first camera receiving portion 210. Accordingly, a sealing process may be provided to prevent formation of the space.

In FIGS. 4A and 4B, the first end of the first camera receiving portion 210 is provided at the interior of the vacuum processing chamber 110, whereby the alignment marks of the first and second substrates 510 and 520 may be observed through the first camera receiving portion 210. In this state, a window 211 may be provided at the first end of the first camera receiving portion 210. The window 211 and the first camera receiving portion 210 may include a high strength glass material that is resistance to the reduced pressure of a vacuum state. The first end of the first camera receiving portion 210 may be provided above the first through hole 121a of the upper stage 121 in the interior of the vacuum processing chamber 110.

Figure 4C:
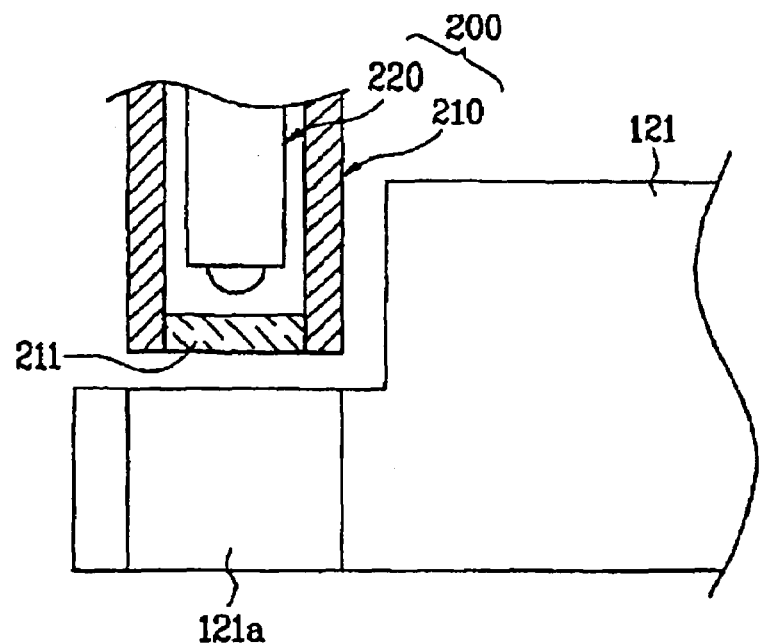
FIG. 4C is an enlarged view of an exemplary alignment system and an upper stage of FIG. 3 according to the present invention.

FIG. 4C is an enlarged view of an exemplary alignment system and an upper stage of FIG. 3 according to the present invention. In FIG. 4C, the first camera receiving portion 210 may be positioned in various configurations to observe the alignment marks of the first and second substrates 510 and 520. For example, the first camera receiving portion 210 may be formed of a length that does not pass through the upper stage 121. In the upper stage 121, an additional receiving groove may be formed for receiving the first camera receiving portion 210. For example, a first portion of the upper stage 121 may be removed for receiving the first camera receiving portion 210, and the first alignment camera 220 may be provided inside the first camera receiving portion 210 to observe the alignment marks of the first and second substrates 510 and 520, thereby assisting in alignment of the first and second substrates 510 and 520.

Figure 4D:
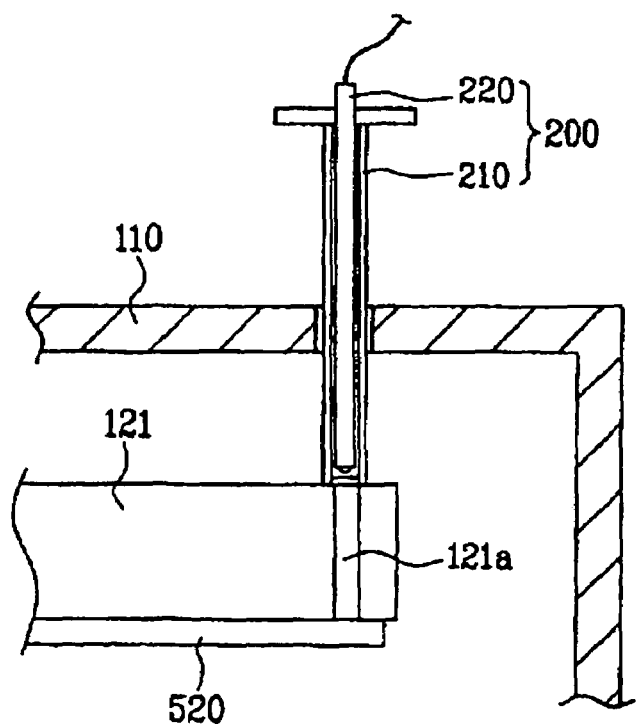
FIG. 4D is a cross sectional view of another exemplary alignment system and an upper stage of FIG. 3 according to the present invention.

FIG. 4D is a cross sectional view of another exemplary alignment system and an upper stage of FIG. 3 according to the present invention. In FIG. 4D, a first end of the first camera receiving portion 210 may be provided at a portion where the first through hole 121a is provided in the upper stage 121. In addition, the first alignment camera 220 may be inserted into the first camera receiving portion 210 so that the first alignment camera 220 travels with the movement of the first camera receiving portion 210. A vacuum generating system 300 may be provided for reducing the pressure of the interior of the vacuum processing chamber 110.

Alternatively, the first end of the first camera receiving portion 210 may be connected to the upper stage moving axis 131 by a screw to travel along the upward and downward movement of the upper stage 121 when the upper stage moving axis 131 rotates. In addition, the first camera receiving portion 210 (in FIGS. 4A–4D) may be fixed to the vacuum chamber 110, and may be connected to the first end of the first align camera 220 (in FIGS. 4A–4D) with the upper stage moving axis 131. Accordingly, the first align camera 220 moves along the downward and upward direction inside of the first camera receiving portion 210 according to the movement of the upper stage moving axis 131.

Figure 5A:
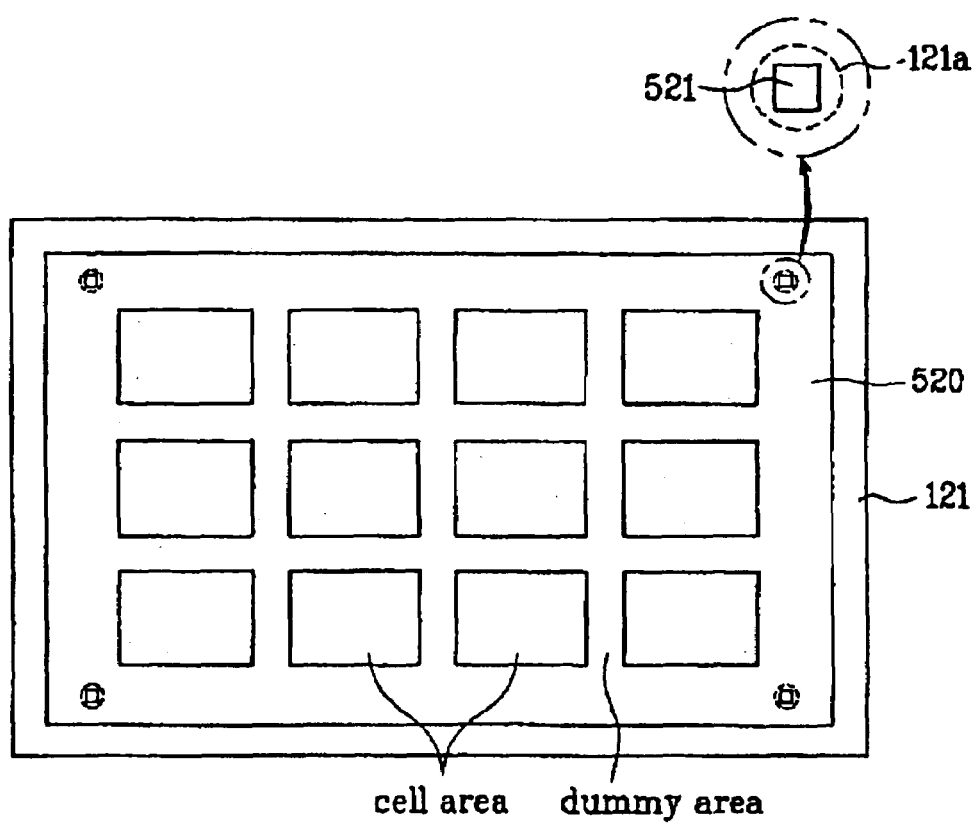
FIG. 5A is a cross sectional view taken along I—I of FIG. 3 according to the present invention.
Figure 5B:
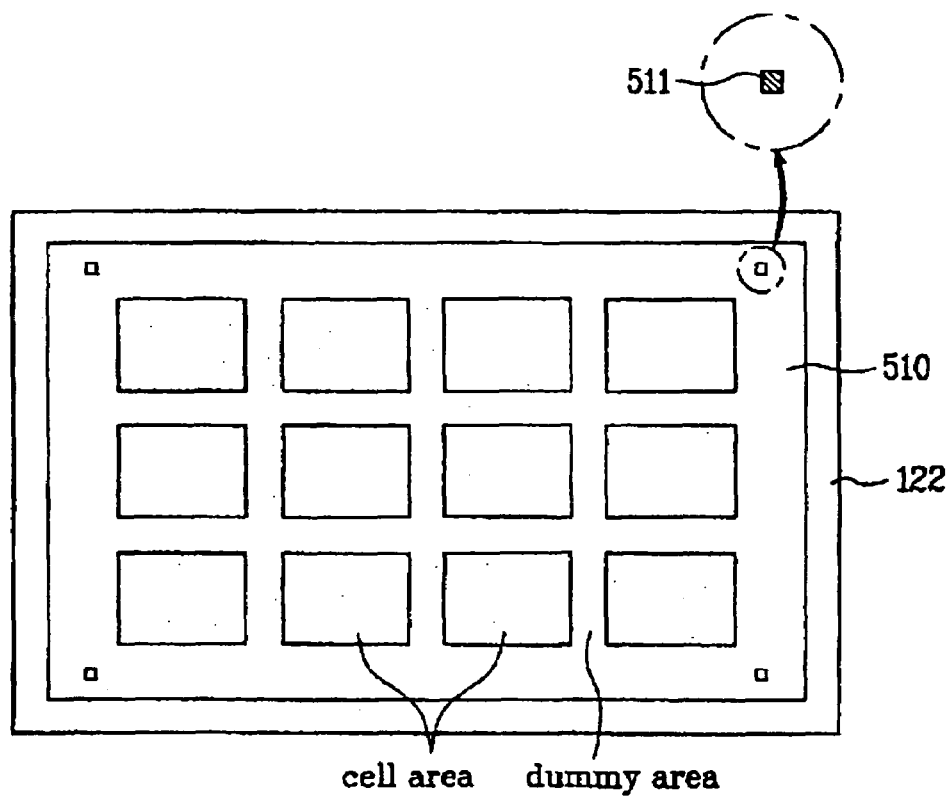
FIG. 5B is a cross sectional view taken along II—II of FIG. 3 according to the present invention.
Figure 6:
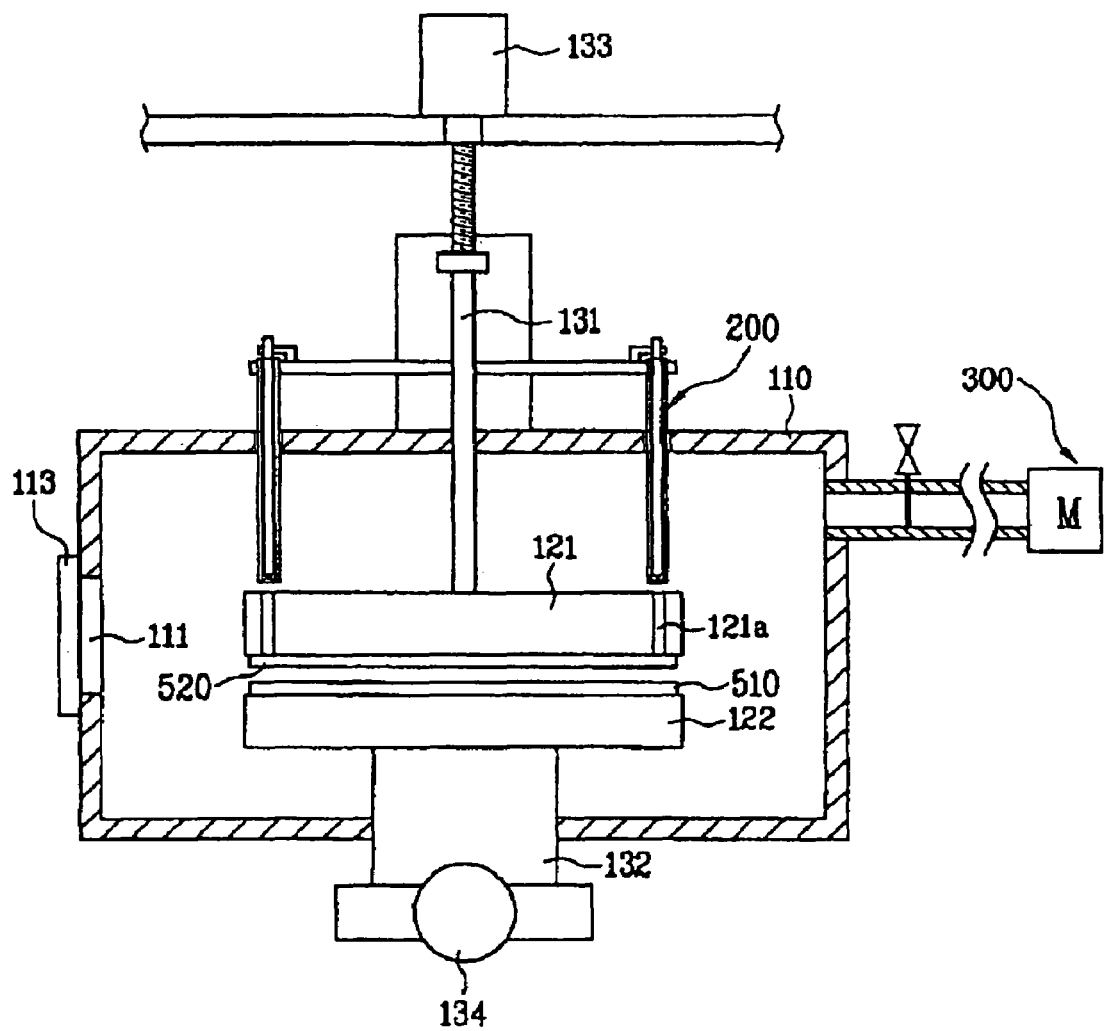
FIG. 6 is a cross sectional view of an exemplary alignment arrangement during an alignment process of the substrate bonding apparatus according to the present invention.

An exemplary process for bonding substrates of an LCD device with the substrate bonding apparatus according to the present invention with regard to FIGS. 5A, 5B, and 6. FIG. 5A is a cross sectional view taken along I—I of FIG. 3 according to the present invention, FIG. 5B is a cross sectional view taken along II—II of FIG. 3 according to the present invention, and FIG. 6 is a cross sectional view of an exemplary alignment arrangement during an alignment process of the substrate bonding apparatus according to the present invention.

In FIG. 6, during an alignment process, first and second substrates 510 and 520 may be loaded onto lower and upper stages 122 and 121, respectively. Then, a vacuum processing chamber door 113 may be operated to close an chamber entrance 111 of the vacuum processing chamber 110, thereby sealing an interior of the vacuum processing chamber 110. Then, a vacuum generating system 300 may be enabled to reduce a pressure in the interior of the vacuum processing chamber 110, thereby creating a vacuum state within the interior of the vacuum processing chamber 110. Once the vacuum state has been reached, an upper stage driving motor 133 of the stage moving system may be driven so that the upper stage moving axis 131 rotates. Accordingly, the upper stage 121 travels along a downward direction to a first location adjacent to the lower stage 122. When the upper stage 121 travels to the first location, the first camera receiving portion 210 of the first alignment system 200 travels along the downward according to the rotation of the upper stage moving axis 131, so that a lower end (i.e., lens) of the first align camera 220 is positioned at a minimum distance from the substrate 510 that is provided on an upper surface of the lower stage 122.

Upon completion of the alignment process, the first alignment camera 220 (in FIGS. 4A–4D) checks alignment marks 511 and 521 (in FIGS. 5A and 5B) of the first and second substrates 510 and 520 that are affixed to the lower and upper stages 122 and 121, respectively. Accordingly, the first alignment camera 220 (in FIGS. 4A–4D) may be focused onto a center point between the alignment marks 511 and 521 to check the alignment state of the first and second substrates 510 and 520. Then, alignment data may be read from the first alignment camera 220 (in FIGS. 4A–4D). Alternatively, the first alignment camera 220 (in FIGS. 4A–4D) may be focused onto each whole align mark 511 and 521. After reading the alignment data relating to the alignment state of the first and second substrates 510 and 520, the stage moving system may be controlled by the alignment data, thereby aligning each substrate along a X-direction, a Y-direction, and rotating angles about a central axis.

Figure 7:
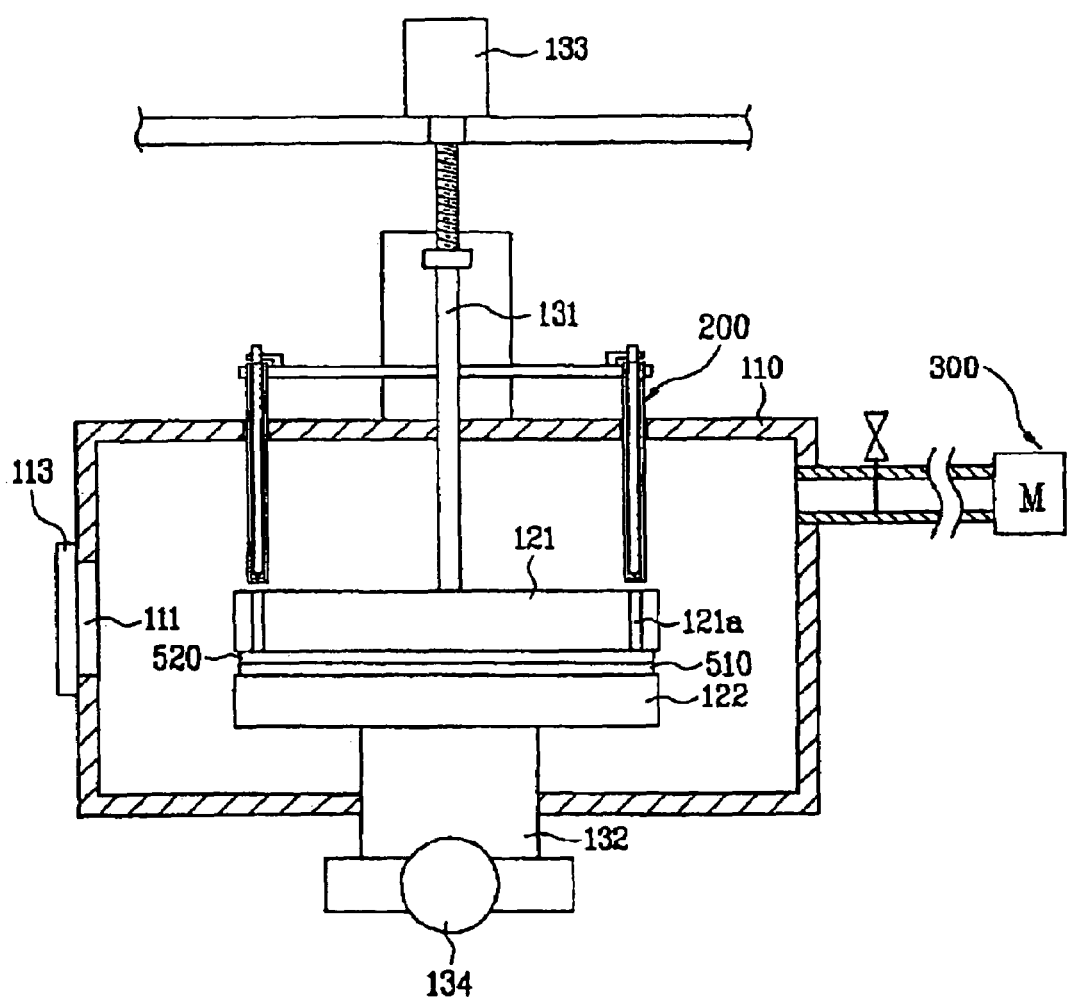
FIG. 7 is a cross sectional view of the exemplary bonding arrangement during a bonding process of the substrate bonding apparatus according to the present invention.

FIG. 7 is a cross sectional view of the exemplary bonding arrangement during a bonding process of the substrate bonding apparatus according to the present invention. In FIG. 7, after the alignment of the first and second substrates 510 and 520, the stage moving system may be driven by a driving signal to bond the first and second substrates 510 and 520 together.

Figure 8A:
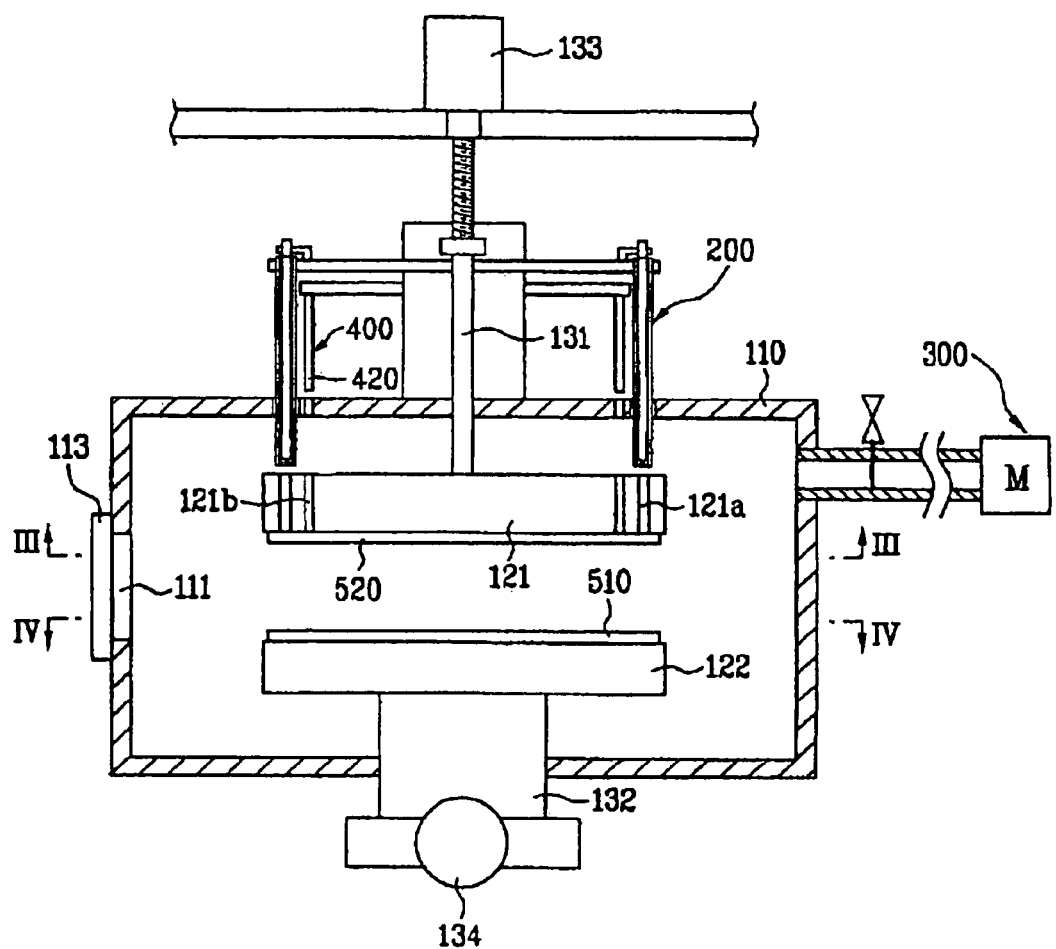
FIG. 8A is a cross sectional view of another exemplary substrate bonding apparatus during a first alignment process according to the present invention.
Figure 8B:
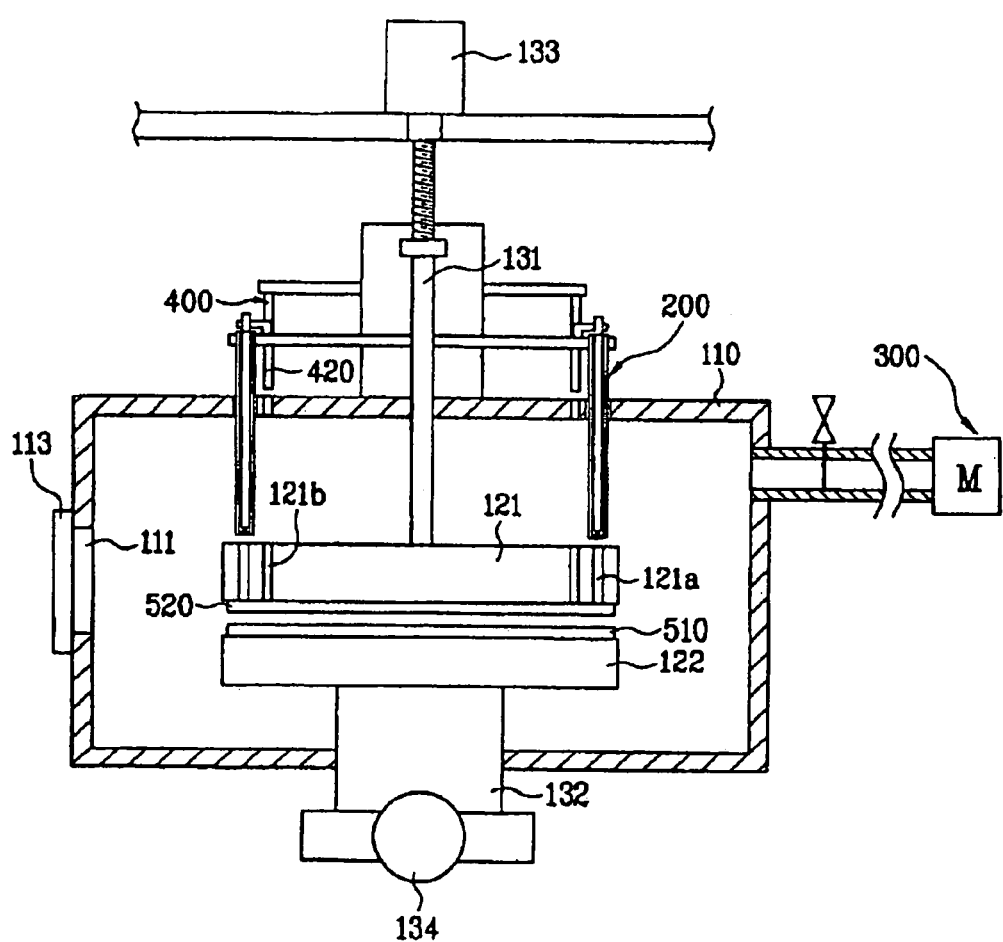
FIG. 8B is a cross sectional view of the exemplary substrate bonding apparatus during a second alignment process according to the present invention.

FIG. 8A is a cross sectional view of another exemplary substrate bonding apparatus during a first alignment process according to the present invention, and FIG. 8B is a cross sectional view of the exemplary substrate bonding apparatus during a second alignment process according to the present invention. In FIG. 8A, a second alignment camera 420 of a second alignment system 400 may form a pair with the first align camera 220 (in FIGS. 4A–4D) for aligning a predetermined portion of the first and second substrates 510 and 520. The second alignment system 400 may be formed in the interior or exterior of the vacuum processing chamber 110. If the first alignment system 200 is designed to align the first and second substrates 510 and 520 more precisely as compared with the second alignment system 400, then the first alignment camera 220 of the first alignment system 200 may be provided in the interior of the vacuum processing chamber 110, and the second alignment camera 420 may be provided in the exterior of the vacuum processing chamber 110. That is, the first alignment system 200 may be provided at a minimum distance from the alignment marks 511 and 521 of the first and second substrates 510 and 520, and the second alignment system may support the first alignment system 200 to precisely align the first and second substrates 510 and 520.

In FIGS. 8A and 8B, each of the first and second alignment cameras 220 (in FIGS. 4A–4D) and 420 face to four corners of each of the first and second substrates 510 and 520 to precisely align each of the first and second substrates 510 and 520. The first and second alignment cameras 220 (in FIGS. 4A–4D) and 420 may face to each central point of four edges of each of the first and second substrates 510 and 520. In addition, the first and second alignment cameras 220 (in FIGS. 4A–4D) and 420 may face two corners of each of the first and second substrates 510 and 520. Alternatively, the first and second alignment cameras 220 (in FIGS. 4A–4D) and 420 may face predetermined portions of two edges in each of the first and second substrates 510 and 520. Moreover, the first and second alignment cameras 220 (in FIGS. 4A–4D) and 420 may face other portions of the first and second substrates 510 and 520, such as portions of dummy regions of the first and second substrates 510 and 520.

Figure 9A:
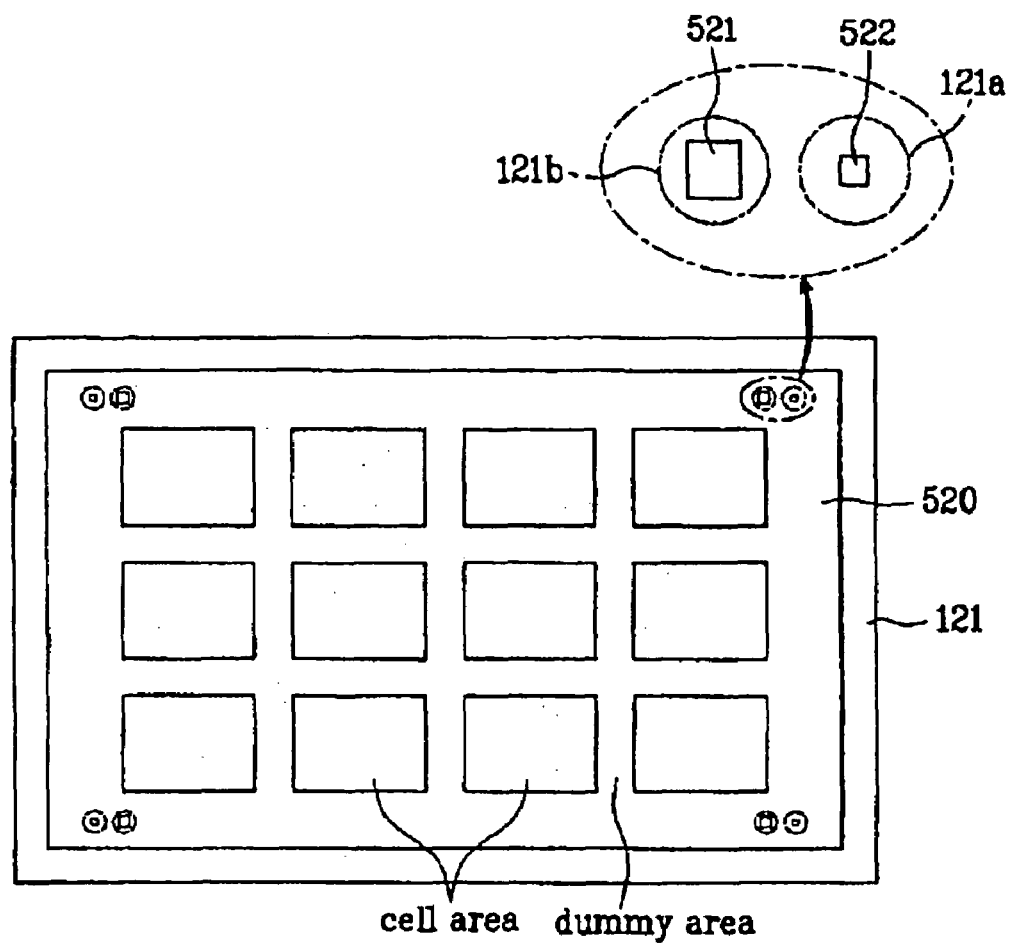
FIG. 9A is a cross sectional view taken along III—III of FIG. 8A according to the present invention.
Figure 9B:
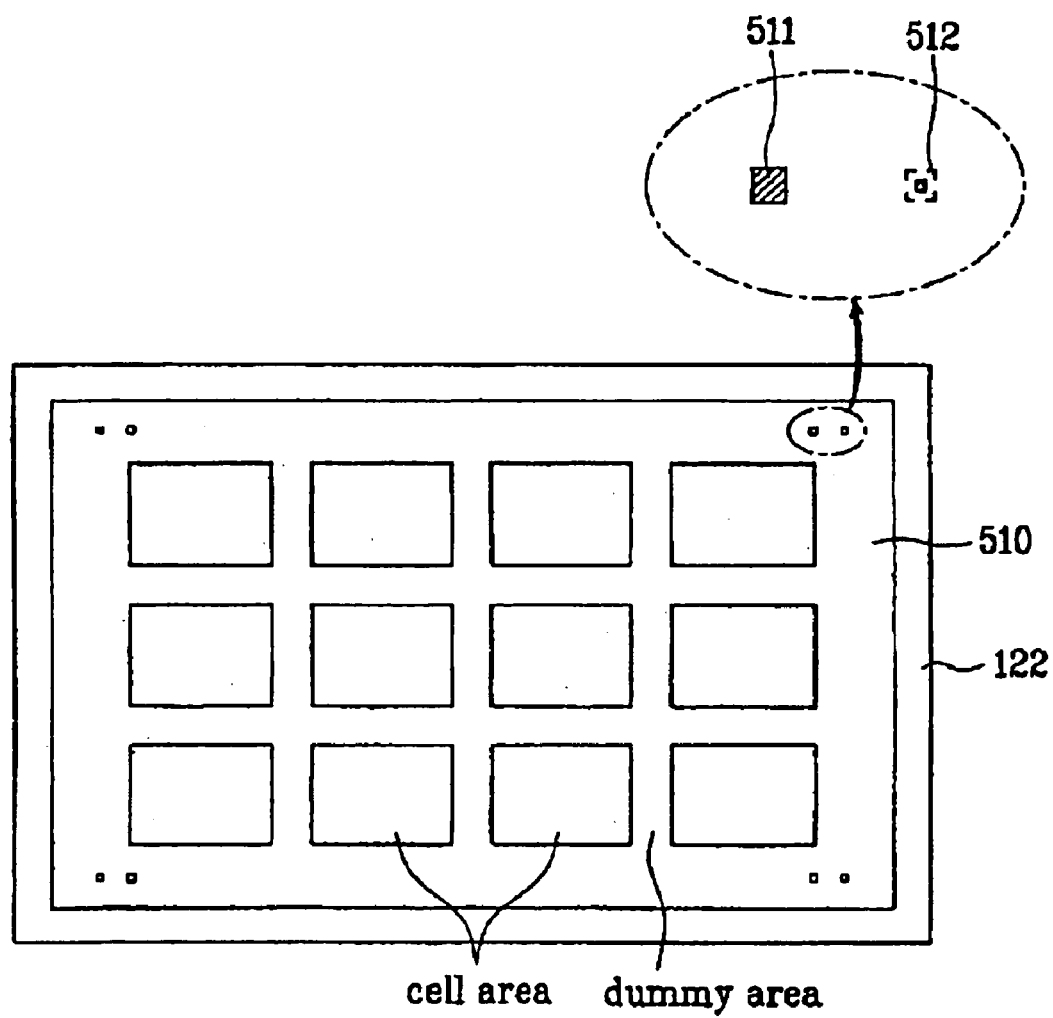
FIG. 9B is a cross sectional view taken along IV—IV of FIG. 8A according to the present invention.

FIG. 9A is a cross sectional view taken along III—III of FIG. 8A according to the present invention, and FIG. 9B is a cross sectional view taken along IV—IV of FIG. 8A according to the present invention. In FIG. 9A, the second substrate 520 may have a second set of alignment marks 521 and 522, and in FIG. 9B the first substrate 510 may have a first set of alignment marks 511 and 512. Accordingly, the first through holes 121a and a plurality of second through holes 121b formed in the upper stage 121 and 121b may be aligned with the alignment marks 511, 521, 512, 522 of the first and second substrates 510 and 520. The first alignment cameras 220 (in FIGS. 4A–4D) may be aligned with each of the first through holes 121a for checking the alignment state of the first and second substrates 510 and 520 via a "rough" alignment mark 522 of the second substrate 520 and a "rough" alignment mark 512 of the first substrate 510. The second alignment cameras 420 (in FIG. 8A) may be aligned with each of the second through holes 121b for checking the alignment state of the first and second substrates 510 and 520 via a "fine" alignment mark 521 of the second substrate 520 and a "fine" alignment mark 511 of the first substrate 510.

Exemplary processing steps for aligning the first and second substrates 510 and 520 in the substrate bonding apparatus according to the present invention will be explained with regard to FIGS. 8A, 8B, 9A, and 9B. The individual process steps for loading each of the first and second substrates 510 and 520, and generating the vacuum state in the interior of the vacuum processing chamber 110 may be the same as the individual process steps previously described with respect to FIGS. 5A, 5B, and 6.

During a first alignment process, the upper stage driving motor 133 of the stage moving system is driven so that the upper stage moving axis 131 rotates, thereby moving the upper stage 121 along a downward direction, as shown in FIG. 8B. In this state, if the upper stage 121 becomes close to the lower stage 122, the upper stage driving motor 133 is disabled. Then, the first and second substrates 510 and 520 may be first aligned by the second alignment cameras 420 of the second alignment system 400. That is, the second alignment cameras 420 may check the "rough" alignment marks 512 and 522 of each of the first and second substrates 510 and 520. The second align camera 420 may check whether the "rough" alignment marks 512 and 522 are within a visual range of the second align camera 420. Accordingly, the second alignment cameras 420 may be focused on the central portion between the first and second substrates 510 and 520 to check the location of the first and second substrates 510 and 520. Thus, each of the first and second substrates 510 and 520 may be first aligned according to the alignment process step. Next, the "fine" alignment marks 511 and 521 of the first and second substrates 510 and 520 may be positioned within the visual range of the first alignment cameras 220 (in FIGS. 4A–4D). Then, the first and second substrates 510 and 520 may be aligned by the first alignment cameras 220 (in FIGS. 4A–4D). Thus, the process step for aligning the first and second substrates 510 and 520 may be performed efficiently and easily.

The first camera receiving portion 210 (in FIGS. 4A–4D) of the first align camera 220 (in FIGS. 4A–4D) may travel along the downward direction along with the upper stage 121, and the lower end (i.e., lens) of the first alignment camera 220 (in FIGS. 4A–4D) may be provided at the minimum distance from each of the first and second substrates 510 and 520. The first alignment camera 220 (in FIGS. 4A–4D) may check the location of each "fine" alignment mark 511 and 521 of both the first and second substrates 510 and 520 to precisely align each of the first and second substrates 510 and 520. Since the "fine" alignment marks 511 and 521 may be positioned within the visual range of the first alignment cameras 220 (in FIGS. 4A–4D) after the first alignment of the first and second substrates 510 and 520, the "fine" alignment marks 511 and 521 may be easily and quickly checked by the first alignment cameras 220 (in FIGS. 4A–4D).

Figure 10A:
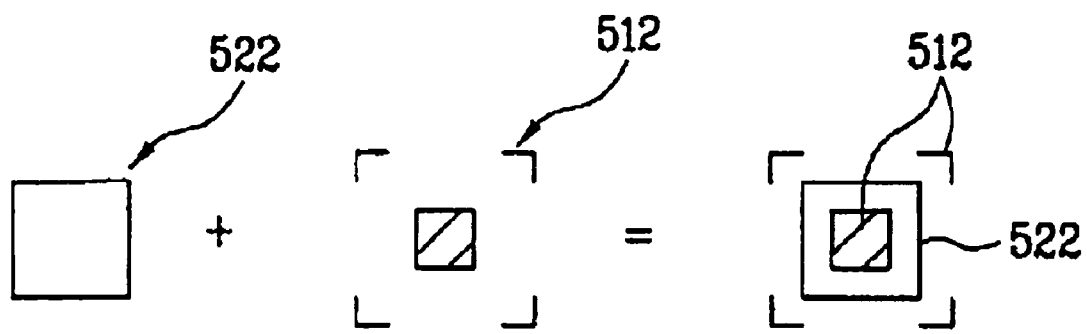
FIG. 10A shows an exemplary rough alignment process for aligning each substrate according to the present invention.
Figure 10B:
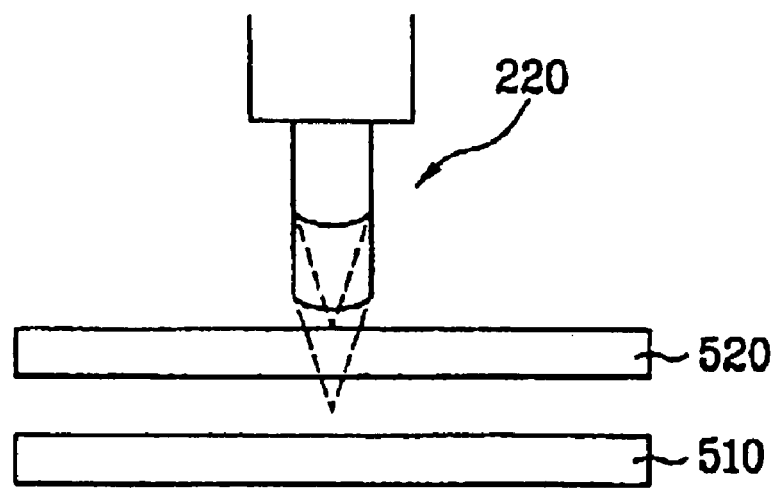
FIG. 10B shows an exemplary process of controlling a rough focus of an alignment camera according to the present invention.

FIG. 10A shows an exemplary rough alignment process for aligning each substrate according to the present invention, and FIG. 10B shows an exemplary process of controlling a rough focus of an alignment camera according to the present invention. In FIGS. 10A and 10B, the first alignment cameras 220 may be focused on the "rough" align mark 522 of the second substrate 520 affixed to the upper stage 121, thereby checking the location of the second substrate 520. Then, the first alignment cameras 220 may be focused on the "rough" alignment marks 512 of the first substrate 510 affixed to the lower stage 122 to check the location of the lower substrate 510. After that, a deflection value may be read with respect to a location between the "rough" alignment marks 512 and 522, and then a displacement value may be calculated using the deflection value, thereby moving the upper stage 121 (in FIG. 8A), or the lower stage according to the calculated displacement. Thus, the first and second substrates 510 and 520 may be aligned.

Figure 10C:
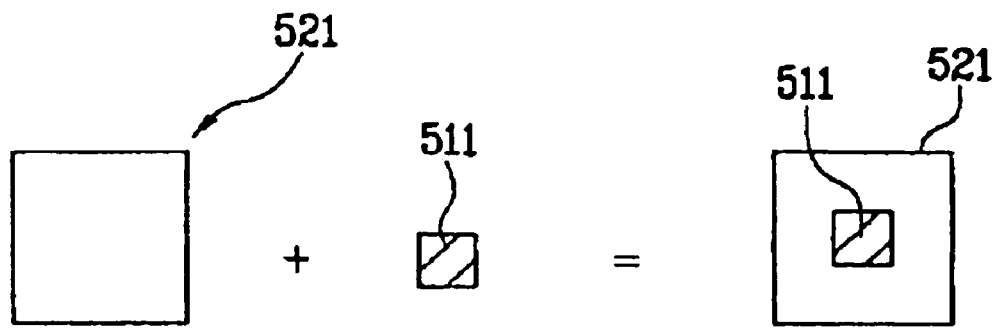
FIG. 10C shows an exemplary fine alignment process for aligning each substrate according to the present invention.
Figure 10D:
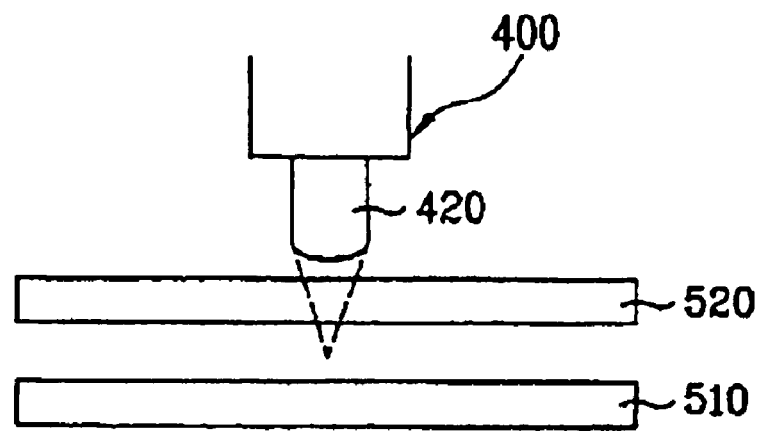
FIG. 10D shows another exemplary process of controlling a fine focus of an alignment camera according to the present invention.

FIG. 10C shows an exemplary fine alignment process for aligning each substrate according to the present invention, and FIG. 10D shows an exemplary process of controlling a fine focus of an alignment camera according to the present invention. In FIGS. 10C and 10D, the second alignment cameras 420 may be focused on the "fine" align mark 521 of the second substrate 520 affixed to the upper stage 121, thereby checking the location of the second substrate 520. Then, the second alignment cameras 420 may be focused on the "fine" alignment mark 511 of the first substrate 510 affixed to the lower stage 122 to check the location of the lower substrate 510. After that, a deflection value may be read with respect to a location between the "fine" alignment marks 511 and 521, and then a displacement value may be calculated using the deflection value, thereby moving the upper stage 121, or the lower stage according to the calculated displacement. Thus, the first and second substrates 510 and 520 may be aligned. After completing the alignment of each of the first and second substrates 510 and 520, the stage moving system may be successively driven by the driving signal, and then the second substrate 520 affixed to the upper stage 121 may be bonded to the first substrate 510 affixed to the lower stage 122 by pressing.

In the substrate bonding apparatus according to the present invention, it may not be necessary to provide the first end of the alignment cameras in the interior of the vacuum chamber 110. Accordingly, the first and second alignment cameras 220 and 420 may be formed in the interior of the vacuum chamber 110, or on the exterior of the vacuum chamber 110. In addition, each of the first and the second alignment systems 200 and 400 may have two alignment cameras, or four alignment cameras. Thus, each of the first and second substrates 510 and 520 may be aligned by checking each of the "fine" alignment marks 511 and 521 positioned on the first and second substrates 510 and 520, or by checking a center point between the "fine" alignment marks 511 and 521 of each of the first and second substrates 510 and 520, or respectively checking the "fine" alignment marks 511 and 521 of each of the first and second substrates 510 and 520 with the first alignment system 200, and at the same time, reading the location value of the center point between the "fine" alignment marks 511 and 521 of each of the first and second substrates 510 and 520.

Figure 11:
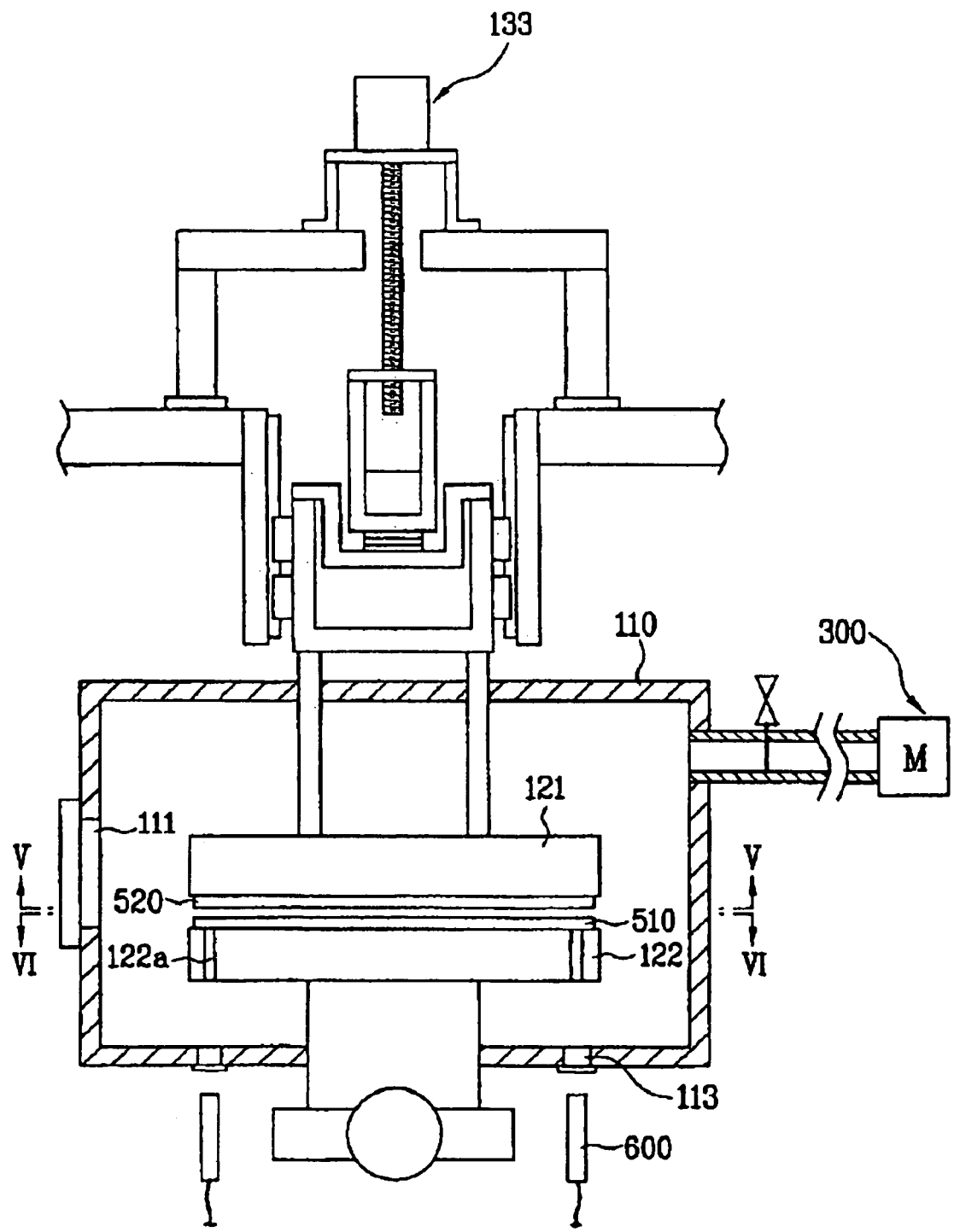
FIG. 11 is a cross sectional view of another exemplary substrate bonding apparatus according to the present invention.
Figure 12:
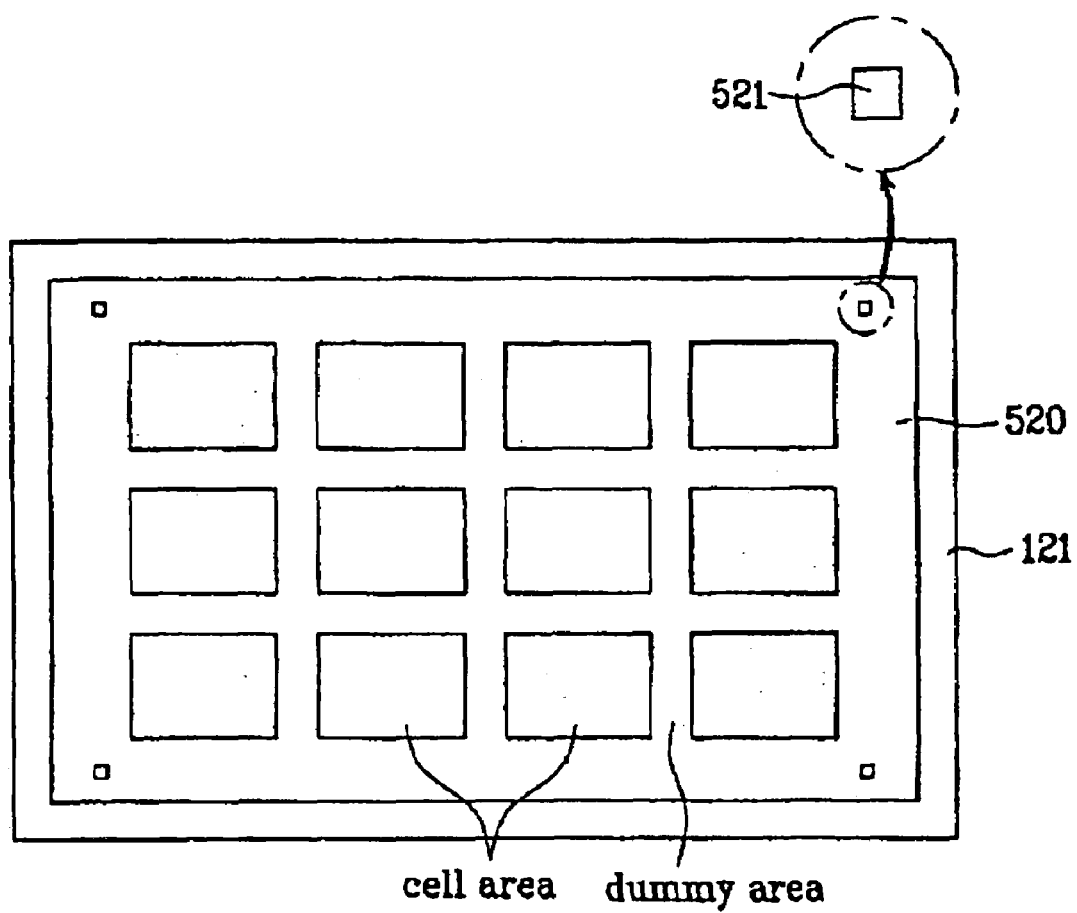
FIG. 12 is a cross sectional view taken along V—V of FIG. 11 according to the present invention.
Figure 13:
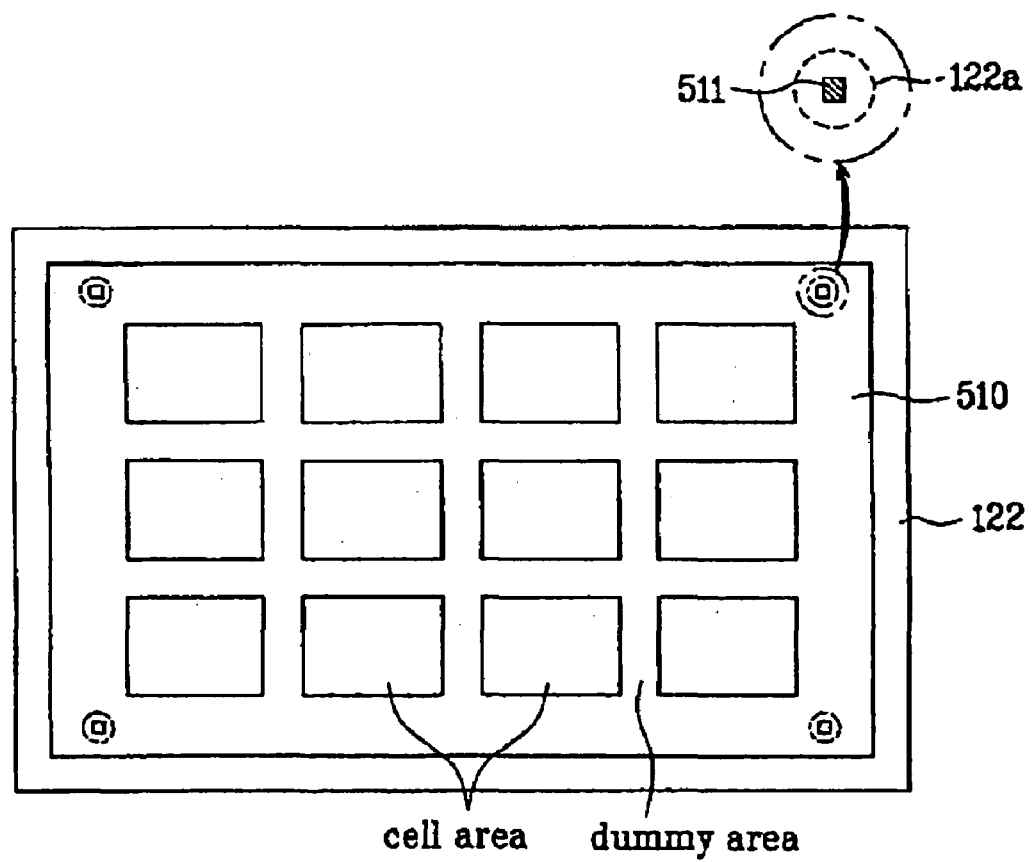
FIG. 13 is a cross sectional view o taken along line VI—VI of FIG. 11 according to the present invention.

FIG. 11 is a cross sectional view of another exemplary substrate bonding apparatus according to the present invention, FIG. 12 is a cross sectional view taken along V—V of FIG. 11 according to the present invention, and FIG. 13 is a cross sectional view taken along line VI—VI of FIG. 11 according to the present invention. In FIGS. 11, 12, and 13, a plurality of through holes 113 may be provided at a bottom of the vacuum processing chamber 110, and a third alignment system 600 may be provided below the vacuum processing chamber 600. Accordingly, a total number of the through holes 113 may be the same as a total number of "rough" and "fine" alignment marks of the first and second substrates 510 and 520. In addition, a plurality of third through holes 122a may be formed in a lower stage 122, which may be aligned to each of the through holes 113 provided at the bottom of the vacuum chamber 110 to check each of the "fine" alignment marks 511 and 521.

The third alignment system 600 may be provided below the vacuum processing chamber 110 to be aligned to the "fine" alignment marks 511 and 521 of the first and second substrates 510 and 520, so that the third alignment system 600 can check the "fine" alignment marks 511 and 521 of the first and second substrates 510 and 520 through the through holes 113 of the vacuum processing chamber 110 and the third through holes 122a of the lower stage 220, thereby aligning each of the first and second substrates 510 and 520. Accordingly, the third alignment system 600 may include a plurality of alignment cameras for checking the alignment marks of the first and second substrates 510 and 520 and for checking the alignment state between the first and second substrates 510 and 520. A total number of the third alignment systems 600 directly corresponds to a total number of the third through holes 122a.

Exemplary processing steps for aligning substrates in the substrate bonding apparatus according to the present invention will be explained with regard to FIGS. 11, 12, and 13. In FIG. 11, the first and second substrates 510 and 520 may be loaded onto the lower and upper stages 122 and 121, respectively, and the vacuum chamber 110 may be sealed. In this state, the pressure in the interior of the vacuum processing chamber 110 may be reduced by a vacuum generating system 300, until the interior of the vacuum processing chamber 110 reaches the vacuum state. Then, the upper stage 121 may travel along a downward direction by enabling the stage moving system, and becomes positioned adjacent to the lower stage 122. Upon completion of the aforementioned process step, the third alignment cameras 600 may check each alignment mark 511 provided on the lower substrate 510 affixed to the lower stage 122 (in FIG. 13), and each alignment mark 521 provided on the upper substrate 520 affixed to the upper stage 121 (in FIG. 12), thereby checking the location of the first and second substrates 510 and 520. Accordingly, the third alignment system 122 may be focused upon a center point between the alignment marks 511 and 521, and may be alternately focused on each alignment mark 511 and 521, thereby checking the location of the first and second substrates 510 and 520. After checking the alignment state of the first and second substrates 510 and 520, the stage moving system may be controlled by reading data relating to the alignment state of the first and second substrates 510 and 520. Accordingly, each of the first and second substrates 510 and 520 may be aligned with respect to X-direction, Y-direction, and opposing angles.

Figure 14:
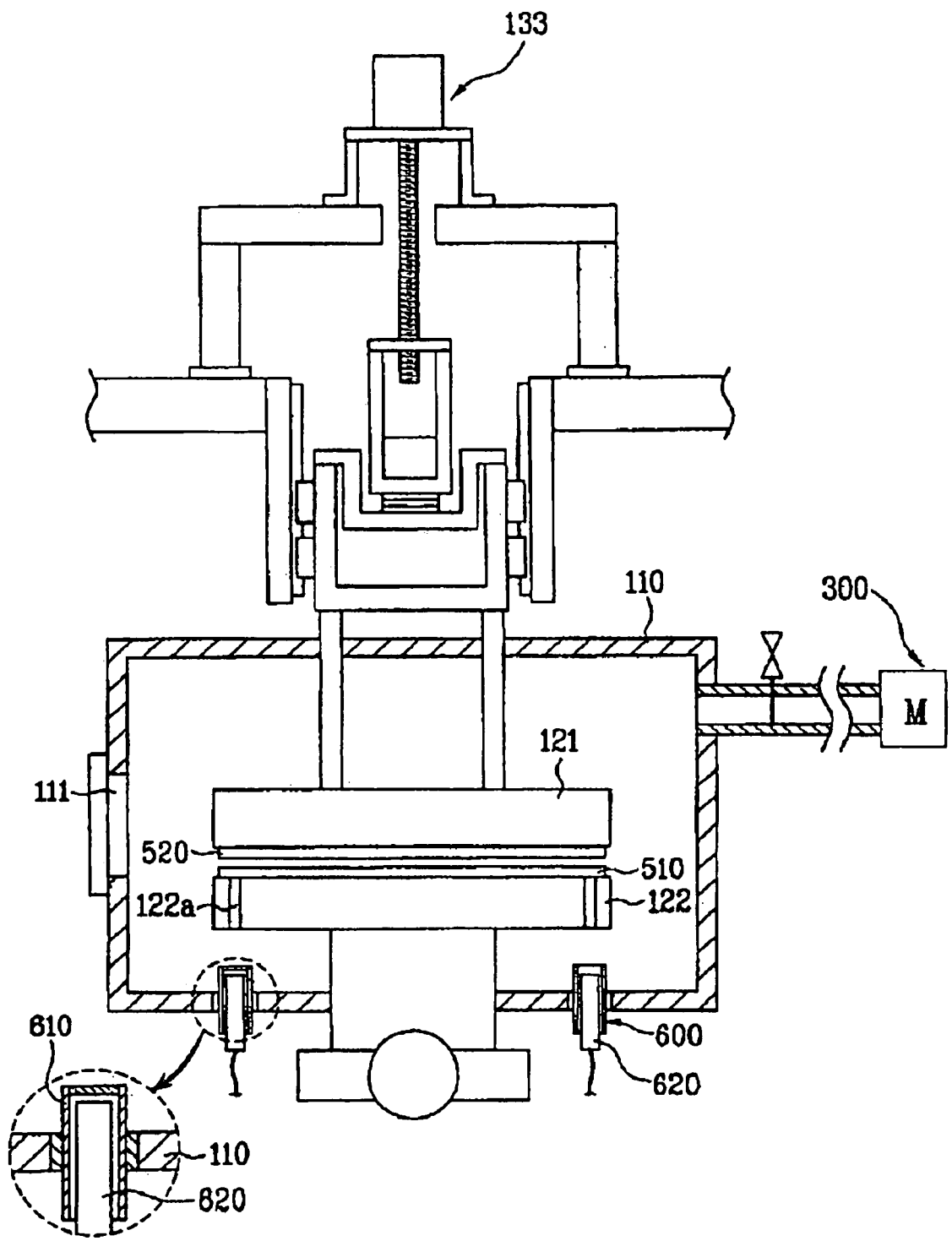
FIG. 14 is a cross sectional view of another exemplary substrate bonding apparatus according to the present invention.

FIG. 14 is a cross sectional view of another exemplary substrate bonding apparatus according to the present invention. In FIG. 14, the third alignment system 600 may be provided in the lower part of the vacuum chamber 110. Accordingly, a first end of the third alignment system 600 may be provided in the interior of the vacuum processing chamber 110 for being close to the alignment marks, thereby improving accuracy in checking the location of the first and second substrates 510 and 520, and reading the location data. Thus, the vacuum processing chamber 110 may further include a third camera receiving portion 610 for receiving the first end of the third alignment system 600. The third camera receiving portion 610 may include a transparent material to protect the third alignment system 600 under the vacuum state.

Figure 15:
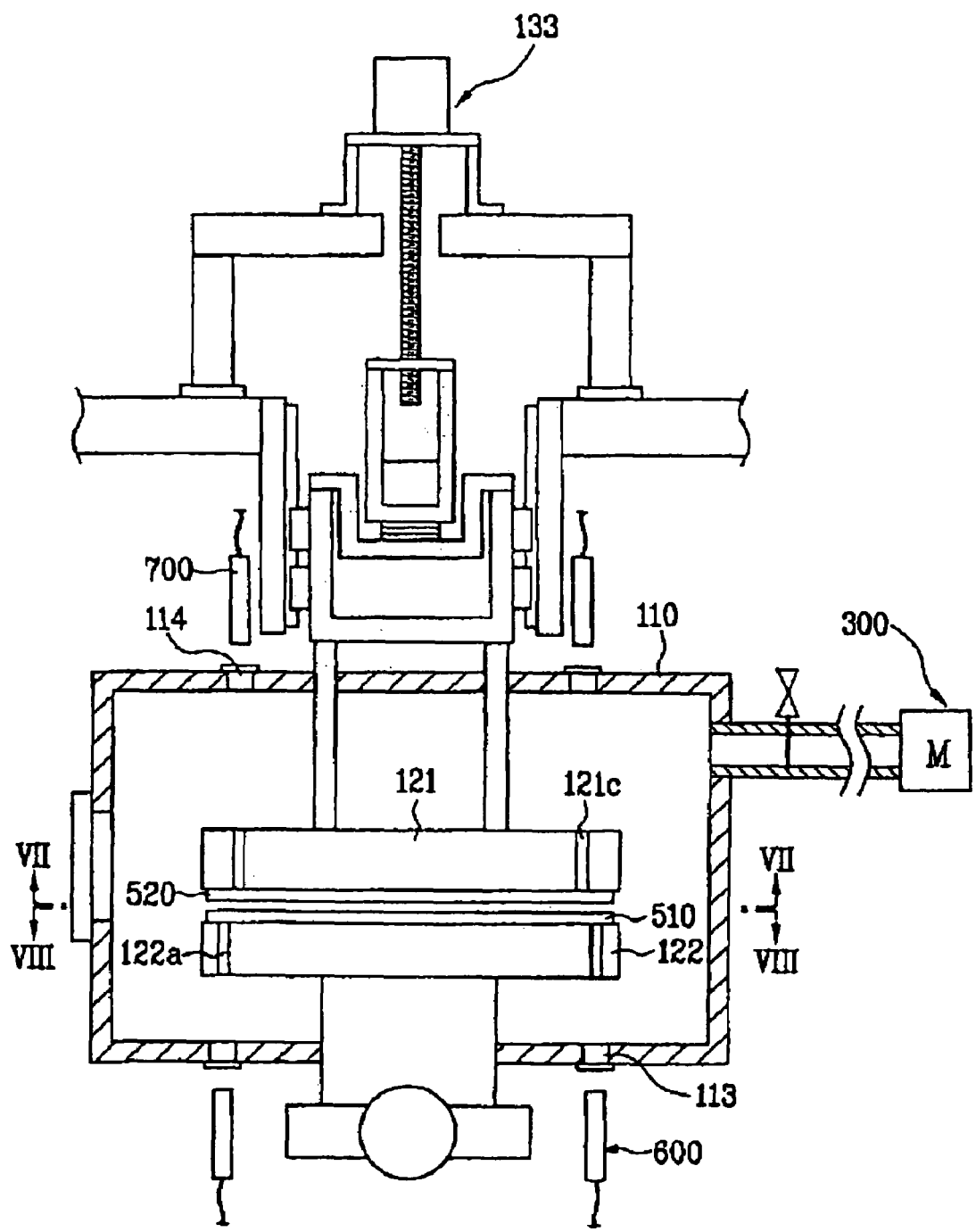
FIG. 15 is a cross sectional view of another exemplary substrate bonding apparatus according to the present invention.
Figure 16:
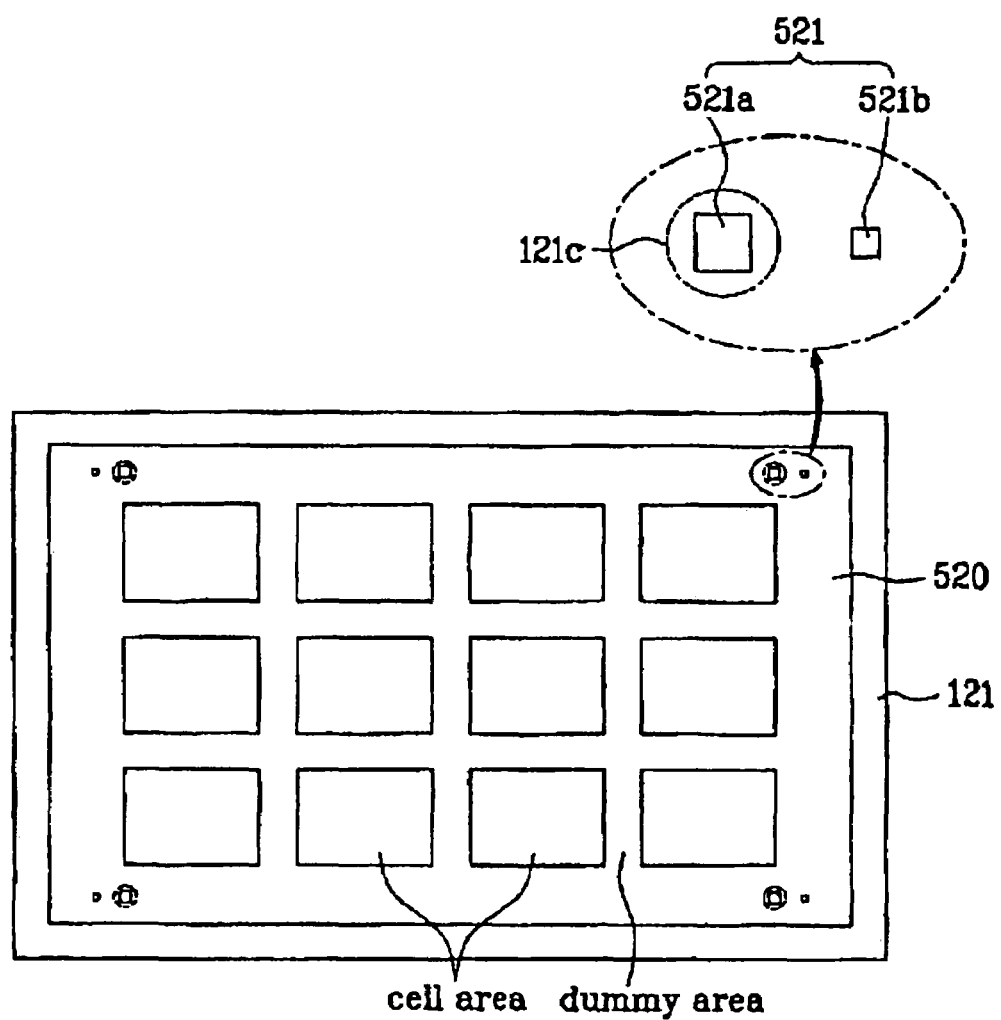
FIG. 16 is a cross sectional view taken along line VII—VII of FIG. 15 according to the present invention.
Figure 17:
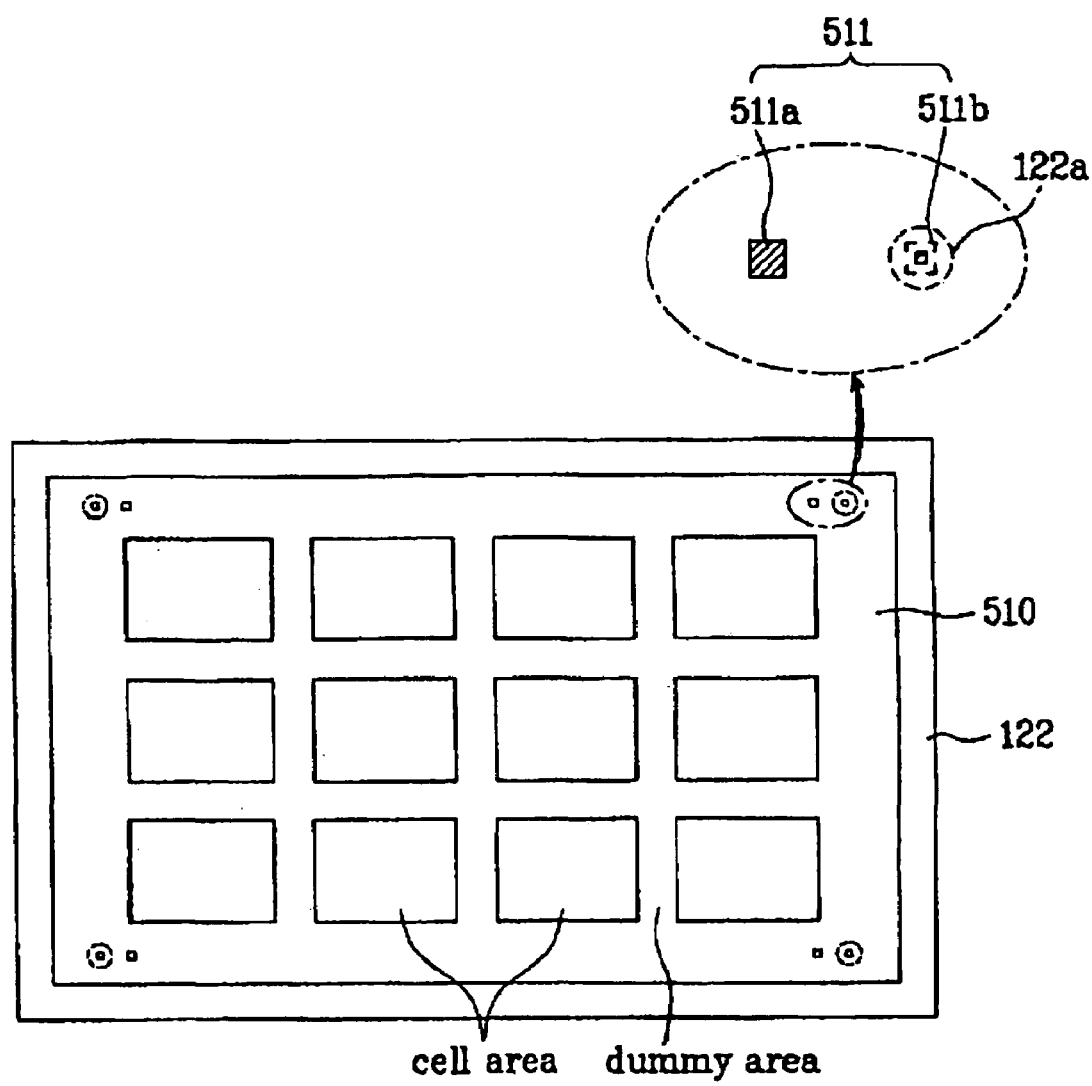
FIG. 17 is a cross sectional view taken along VII—VII of FIG. 15 according to the present invention.

Exemplary processing steps for aligning each substrate with the substrate bonding apparatus according to the present invention may be the same as the processing step detailed in FIGS. 11, 12, and 13, so that the explanation will be omitted. FIG. 15 is a cross sectional view of another exemplary substrate bonding apparatus according to the present invention, FIG. 16 is a cross sectional view taken along line VII—VII of FIG. 15 according to the present invention, and FIG. 17 is a cross sectional view taken along VIII—VIII of FIG. 15 according to the present invention.

In FIG. 15, an fourth alignment system 700 may include fourth alignment cameras paired with the third alignment system 600 having the third alignment cameras in order to align each substrate by checking each alignment mark of the substrates. The third alignment system 700 may be provided to align the location of the first and second substrates 510 and 520 more precisely, and the fourth alignment system 700 may be provided to support the third alignment system 600 for aligning the first and second substrates 510 and 520. Accordingly, the third alignment system 600 may be provided at the minimum distance from the alignment marks 511 and 521 of the first and second substrates 510 and 520.

The fourth alignment system 700 may be provided above the vacuum processing chamber 110 to align the first and second substrates 510 and 520 via a plurality of through holes 114. The fourth alignment system 700 checks "rough" alignment marks 511a and 521a of the first and second substrates 510 and 520 (in FIGS. 17 and 18), and the third alignment system 600 checks "fine" alignment marks 511b and 521b of the first and second substrates 510 and 520. That is, the fourth alignment system 700 approximately aligns the first and second substrates 510 and 520 via the "rough" alignment marks 511a and 521a, and the third alignment system 600 precisely aligns the first and second substrates 510 and 520 via the "fine" align marks 511b and 521b.

Alternatively, the fourth alignment system 700 may be provided at a portion relatively close to the third alignment system 600 below the vacuum processing chamber 110. However, since a space below the vacuum chamber 110 is generally small, and the fourth alignment system 700 does not require high accuracy, it may be preferable to provide the fourth alignment system 700 above the vacuum chamber 110.

Figure 18A:
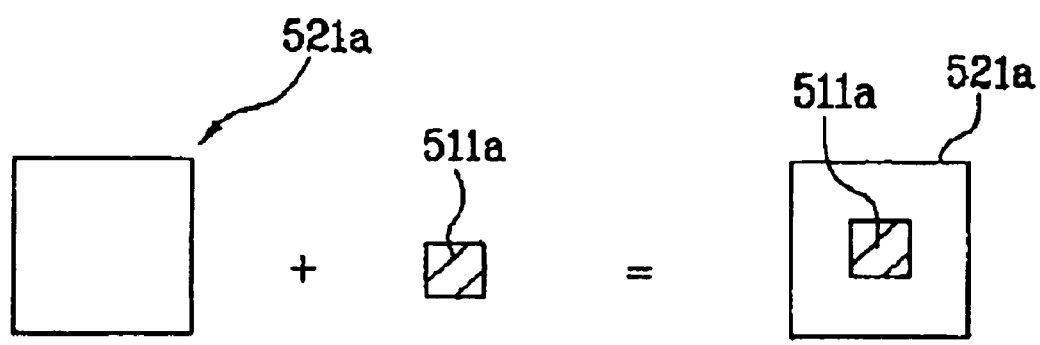
FIG. 18A shows another exemplary process of aligning each substrate according to the present invention.
Figure 18B:
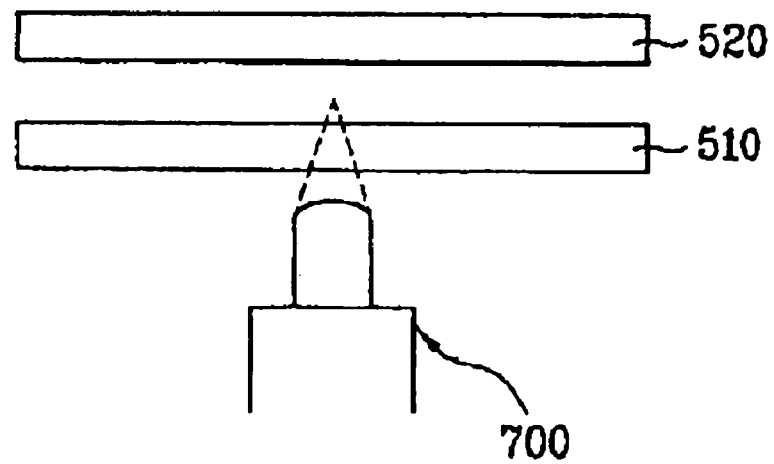
FIG. 18B shows another exemplary process of controlling a focus of an alignment camera according to the present invention.

In the substrate bonding apparatus according to the present invention, each substrate may be aligned in the same way as the alignment process of FIGS. 11, 12, and 13. In addition, the fourth alignment system 700 may approximately align the first and second substrates 510 and 520, and the third alignment system 600 may precisely align the first and second substrates 510 and 520. That is, the fourth alignment system 700 first checks the "rough" alignment marks 511 and 521 of the first and second substrates 510 and 520, as shown in FIGS. 16 and 17, via first through holes 114 provided at the top of the vacuum processing chamber 110 and fourth through holes 121c provided in the upper stage 121. In FIG. 18A, the fourth alignment system 700 checks whether the "rough" alignment marks 511a and 521a are within the visual range of the fourth alignment system 700. Accordingly, the fourth alignment system 700 may be focused on a center point between the first and second substrates 510 and 520 to check the location of the substrates, as shown in FIG. 18B.

The "fine" alignment marks 511b and 521b of the first and second substrates 510 and 520 are first aligned for being positioned within the visual range of the third alignment system 600, thereby quickly and easily aligning the first and second substrates 510 and 520 at a high accuracy. If the "rough" alignment marks 511a and 521a of the first and second substrates 510 are 520 are positioned within the visual range of the fourth alignment system 700, the third alignment system 600 performs a second alignment of the first and second substrates 510 and 520. That is, the third alignment system 600 checks the "fine" alignment marks 511b and 521b of the first and second substrates 510 and 520 through the third through holes 122a provided in the lower stage 122, and precisely aligns the location of the first and second substrates 510 and 520. Since the "fine" alignment marks 511b and 521b are already positioned within the visual range of the third alignment system 600, the third alignment system 600 checks the location of the first and second substrates 510 and 520 more easily and exactly.

Figure 18C:
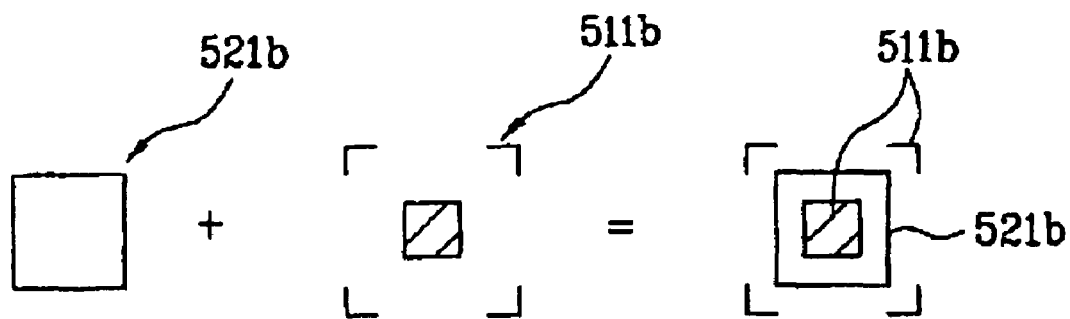
FIG. 18C shows another exemplary process of aligning each substrate according to the present invention.
Figure 18D:
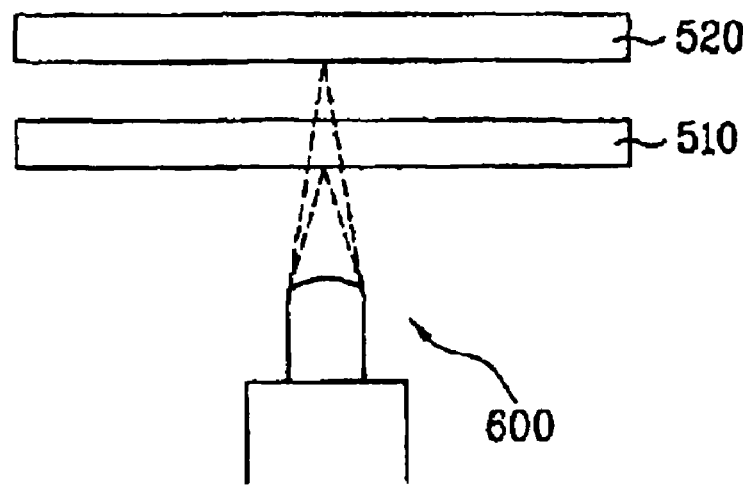
FIG. 18D shows another exemplary process of controlling a focus of an alignment camera according to the present invention.

The first and second substrates 510 and 520 may be aligned by the third alignment system 600 in the following method. The third alignment system 600 may be focused on the "fine" alignment mark 521b of the second substrate 520 affixed to the upper stage 121 to check the location of the second substrate 520. Then, the third alignment system 600 may be focused on the "fine" alignment mark 511b of the first substrate 510 affixed to the lower stage 122 to check the location of the first substrate 510, as shown in FIGS. 18C and 18D. Next, a deflection value may be read according to the location between the "fine" alignment marks 511b and 521b. Then, a displacement may be calculated using the deflection value, thereby moving the upper stage 121, or the lower stage 122 according to the calculated displacement. Accordingly, the first and second substrates 510 and 520 may be precisely aligned.

It will be apparent to those skilled in the art that various modifications and variations can be made in the substrate bonding apparatus for liquid crystal display device of the present invention. Thus, it is intended that the present invention covers the modifications and variations of this invention provided they come within the scope of the appended claims and their equivalents.

What is claimed is:

1. A substrate bonding apparatus of a liquid crystal display device, comprising:
    a vacuum processing chamber;
    an upper stage provided in an upper space of the vacuum processing chamber;
    a lower stage provided in a lower space of the vacuum processing chamber, the lower stage having at least one first through hole;
    a stage moving system for moving each of the upper and lower stages; and
    at least one first alignment system provided in a lower portion of the vacuum processing chamber for aligning a first substrate affixed to the lower stage and a second substrate affixed to the upper stage through the first through hole,
    wherein a first end of the first alignment system is provided at an interior of the vacuum processing chamber by passing through a bottom of the vacuum chamber.

2. The apparatus according to claim 1, wherein the first alignment system is provided below the vacuum processing chamber facing alignment marks of the first and second substrates.

3. The apparatus according to claim 1, wherein the vacuum processing chamber includes a receiving portion for receiving the first end of the first alignment system.

4. The apparatus according to claim 1, wherein the first alignment system is aligned to a first plurality of alignment marks of the first and second substrates.

5. The apparatus according to claim 1, wherein the lower stage includes a second through hole.

6. The apparatus according to claim 5, further including a second alignment system provided below the vacuum chamber for aligning the first and second substrates through the second through hole.

7. The apparatus according to claim 6, wherein the second through hole is aligned to a second set of alignment marks of the first and second substrates.

8. The apparatus according to claim 1, wherein the upper stage includes a first through hole.

9. The apparatus according to claim 8, further including a second alignment system provided above the vacuum processing chamber for aligning the first and second substrates through the first through hole of the upper substrate.

* * * * *